(12) United States Patent
Konishi et al.

(10) Patent No.: US 11,739,171 B2
(45) Date of Patent: Aug. 29, 2023

(54) METHOD FOR PRODUCING α-OLEFIN/(METH)ACRYLIC ACID ESTER COPOLYMER

(71) Applicants: JAPAN POLYETHYLENE CORPORATION, Tokyo (JP); JAPAN POLYPROPYLENE CORPORATION, Tokyo (JP)

(72) Inventors: Yohei Konishi, Kanagawa (JP); Hiromasa Tanahashi, Kanagawa (JP); Hisashi Ohtaki, Kanagawa (JP); Naomasa Sato, Kanagawa (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 298 days.

(21) Appl. No.: 17/040,172

(22) PCT Filed: Mar. 18, 2019

(86) PCT No.: PCT/JP2019/011183
§ 371 (c)(1),
(2) Date: Sep. 22, 2020

(87) PCT Pub. No.: WO2019/188499
PCT Pub. Date: Oct. 3, 2019

(65) Prior Publication Data
US 2021/0122853 A1    Apr. 29, 2021

(30) Foreign Application Priority Data

Mar. 28, 2018 (JP) ................. 2018-062248

(51) Int. Cl.
| | | |
|---|---|---|
| C08F 4/70 | (2006.01) | |
| C08F 220/18 | (2006.01) | |
| C08F 210/02 | (2006.01) | |
| C08F 4/659 | (2006.01) | |

(52) U.S. Cl.
CPC ........ *C08F 210/02* (2013.01); *C08F 4/65912* (2013.01); *C08F 4/7027* (2013.01); *C08F 4/7031* (2013.01); *C08F 4/7098* (2013.01); *C08F 220/1804* (2020.02)

(58) Field of Classification Search
CPC .... C08F 4/7027; C08F 4/7031; C08F 4/7098; C08F 220/10; C08F 220/1804
See application file for complete search history.

(56) References Cited

U.S. PATENT DOCUMENTS 4,496,700 A * 1/1985 Colon ................. C08F 38/00
526/111

8,618,319 B2    12/2013  Shimizu et al.
2007/0049712 A1  3/2007  Allen et al.
2017/0210830 A1  7/2017  Konishi et al.

FOREIGN PATENT DOCUMENTS

| CN | 102174129 A | 9/2011 |
| JP | 2005-263895 A | 9/2005 |
| JP | 2005-307021 A | 11/2005 |
| JP | 2016-17134 A | 2/2016 |
| JP | 2016-29170 A | 3/2016 |
| WO | 2010/050256 A1 | 5/2010 |

OTHER PUBLICATIONS

E. Drent et al., "Palladium catalysed copolymerisation of ethene with alkylacrylates: polar comonomer built into the linear polymer chain", Chemical Communications, 2002, issue 7, <DOI:10.1039/B111252J>, pp. 744-745.
J. Nowack Ruddiger et al., "New Phenylnickel-(2-phosphinobenzenesulfonate) Triphenylphosphine Complexes as Highly Active Ethylene Polymerization Catalysts, Journal of Inorganic and General Chemistry", Oct. 2005, vol. 631, issue 13, 14, <DOI:10.1002/zaac.200500134>, pp. 2775-2781.
S. Mecking et al., J. Am. Chem. Soc., 198, 120, 888.
T. Koichi et al., Dalton Trans., 2006, 25.
ISR, IPO, Application No. PCT/JP2019/011183, dated Jun. 18, 2019, English translation.
IPRP, IPO, Application No. PCT/JP2019/011183, dated Sep. 29, 2020, English translation.
The Extended European Search Report, EPO, Application No. 19776868.2, dated Apr. 28, 2021.
Office Action issued in Chinese Patent Application No. 201980021884.X, dated Nov. 30, 2022, translation.
Office Action issued in Chinese Patent Application No. 201980021884.X, dated Jul. 27, 2022, translation.
Office Action issued in Japanese Patent Application No. 2019-049945, dated Sep. 27, 2022, translation.
European Office Action issued in European Patent Application No. 19776868.2, dated Jan. 26, 2023.
Office Action issued in Japanese Patent Application No. 2019-049945, dated Mar. 7, 2023, translation.
Office Action issued in CN Patent Application No. 201980021884.X, dated Mar. 8, 2023, translation.

\* cited by examiner

*Primary Examiner* — Caixia Lu
(74) *Attorney, Agent, or Firm* — Greenblum & Bernstein, P.L.C.

(57) ABSTRACT

A catalyst configured to be handled more easily than conventional catalysts and configured to copolymerize an α-olefin and a (meth)acrylic acid ester with high activity. The objects are achieved by polymerization using an olefin polymerization catalyst which contains a metal complex obtained by reacting a ligand having a specific structure and a transition metal compound containing a transition metal selected from nickel or palladium having a specific structure.

12 Claims, No Drawings

METHOD FOR PRODUCING α-OLEFIN/(METH)ACRYLIC ACID ESTER COPOLYMER

TECHNICAL FIELD

The present invention relates to a method for producing an α-olefin/(meth)acrylic acid ester copolymer, the method using an olefin polymerization catalyst which contains a metal complex comprising a phosphine phenolate ligand having a specific structure and a nickel acetylacetonato-type compound.

BACKGROUND ART

A method for copolymerizing an ethylene and a vinyl acetate or a (meth)acrylic acid ester, which is a polar group containing vinyl monomer, by high-temperature, high-pressure radical copolymerization, is a well-known method. However, this method is disadvantageous in that due to the production of many branches, the thus-obtained copolymer is a copolymer with low crystallinity and, therefore, low strength. Brookhart, et al. reported that a copolymer of an ethylene and an acrylic ester can be produced by using, as a catalyst, a palladium complex having an α-diimine ligand (see Non-patent Literature 1). However, the thus-obtained copolymer is a copolymer with a rich branched structure and low crystallinity.

Pugh et al. (see Non-patent Literature 2), Nozaki et al. (see Non-patent Literature 3) and Goodall et al. (see Patent Literature 1) reported that a copolymer of an ethylene and a methyl acrylate is obtained by using, as a catalyst, a palladium complex having a phosphinosulfonic acid ligand. However, due to the use of rare and expensive palladium, the catalyst used in these known literatures face a large problem in industrial use.

We reported that a copolymer of an ethylene and a (meth)acrylic acid ester, which has less branches, is obtained by use of a nickel catalyst having a so-called SHOP-based ligand, which is a ligand in which phosphorus and oxygen are used as coordinating atoms (see Patent Literature 2). However, its industrialization is problematic in that due to the use of nickel(0) and palladium(0) sources, which are unstable in the air, it is difficult to handle the catalyst, and the catalyst activity is insufficient.

CITATION LIST

Patent Literatures

Patent Literature 1: U.S. Patent Application Publication No. 2007/0049712
Patent Literature 2: International Publication No. WO2010/050256
Patent Literature 3: Japanese Patent Application Laid-Open No. 2005-307021

Non-Patent Literatures

Non-patent Literature 1: S. Mecking et al., "J. Am. Chem. Soc." 1998, 120, 888.
Non-patent Literature 2: E. Drent et al., "Chem. Commun." 2002, 744.
Non-patent Literature 3: T. Kochi et al., "Dalton Trans." 2006, 25.

SUMMARY OF INVENTION

Technical Problem

The use of highly-stable nickel(II) or palladium(II) is thought to be necessary to overcome the above problems at the same time.

A catalyst obtained by combining a phosphonium salt and a nickel(II) compound, is disclosed in Patent Literature 3. However, Patent Literature 3 only reported ethylene polymerization, and it is not clear if the copolymerization of an α-olefin and a (meth)acrylic acid ester proceeds.

To overcome the above problems, the inventors of the present invention made research and found that an olefin polymerization catalyst configured to be handled more easily than before and configured to have high activity, can be achieved by combining a SHOP-based ligand having a specific structure with a nickel(II) compound and/or a palladium(II) compound. As a result, the present invention was achieved.

Solution to Problem

The inventors of the present invention found that by using bis(acetylacetonato)nickel(II) in place of nickel cyclooctadiene (Ni(cod)$_2$) which has been used as a metal source, the thus-obtained catalyst can be handled much more easily than conventional catalysts, and copolymerization of an ethylene and a (meth)acrylic acid ester proceeds with high activity. As a result, the present invention was achieved.

The method for producing the α-olefin/(meth)acrylic acid ester copolymer according to the present invention, is a method wherein a metal complex obtained by reacting a compound represented by the following general formula (A) or (B) with a transition metal compound containing a transition metal selected from nickel or palladium having a structure of the following general formula (C), is used:

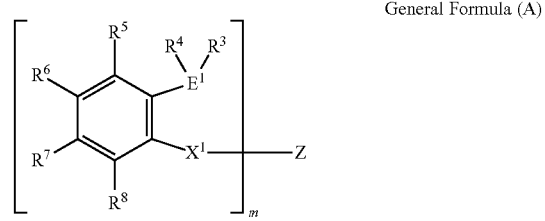

General Formula (A)

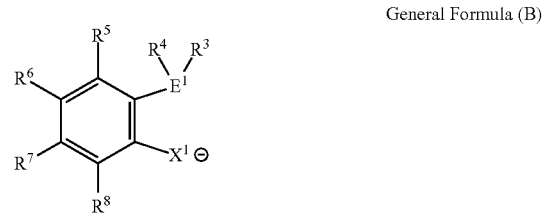

General Formula (B)

General Formula (C)

wherein, in the general formulae (A) to (C), $R^3$ to $R^{11}$, $E^1$ and $X^1$ are as follows:

$X^1$ represents oxygen or sulfur;

$E^1$ represents phosphorus, arsenic or antimony;

$R^3$ and $R^4$ each independently represent a hydrocarbon group having 5 to 30 carbon atoms and optionally containing a heteroatom;

$R^5$ to $R^8$ each independently represent a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2;

$R^9$ to $R^{11}$ each independently represent a hydrogen atom or a hydrocarbon group having 1 to 20 carbon atoms and optionally containing a heteroatom, and wherein, in the general formula (A), Z represents a hydrogen atom or a leaving group, and m represents a valence of Z.

In the method for producing the α-olefin/(meth)acrylic acid ester copolymer according to the present invention, a metal complex represented by the following general formula (D) is used:

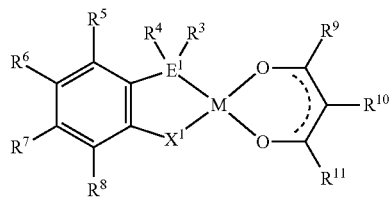

General Formula (D)

wherein $R^3$ to $R^{11}$, $E^1$, $X^1$ and M are as follows:

M represents nickel or palladium;

$X^1$ represents oxygen or sulfur;

$E^1$ represents phosphorus, arsenic or antimony;

$R^3$ and $R^4$ each independently represent a hydrocarbon group having 5 to 30 carbon atoms and optionally containing a heteroatom;

$R^5$ to $R^8$ each independently represent a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2; and $R^9$ to $R^{11}$ each independently represent a hydrogen atom or a hydrocarbon group having 1 to 20 carbon atoms and optionally containing a heteroatom.

In the method for producing the α-olefin/(meth)acrylic acid ester copolymer according to the present invention, $R^3$ and $R^4$ may each independently represent a hydrocarbon group having 5 to 30 carbon atoms and at least one heteroatom-containing group.

In the method for producing the α-olefin/(meth)acrylic acid ester copolymer according to the present invention, $R^8$ may represent a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2.

In the method for producing the α-olefin/(meth)acrylic acid ester copolymer according to the present invention, $R^9$ and $R^{11}$ may be methyl groups, and $R^{10}$ may be a hydrogen atom.

In the method for producing the α-olefin/(meth)acrylic acid ester copolymer according to the present invention, an α-olefin and a (meth)acrylic acid ester may be copolymerized in a presence of an olefin polymerization catalyst containing the metal complex and an organoaluminum compound.

Advantageous Effects of Invention

The olefin polymerization catalyst containing the metal complex used in the present invention, can be handled much more easily than conventional catalysts and can copolymerize an α-olefin and a (meth)acrylic acid ester with high activity.

DESCRIPTION OF EMBODIMENTS

1. Metal Complex

The metal complex of the present invention is a metal complex obtained by reacting a compound represented by the following general formula (A) or (B) with a transition metal compound containing a transition metal selected from nickel or palladium having a structure of the following general formula (C), is used:

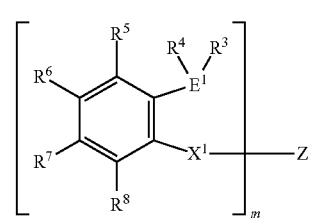

General Formula (A)

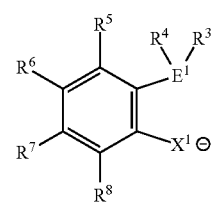

General Formula (B)

General Formula (C)

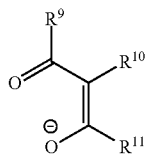

wherein, in the general formulae (A) to (C), $R^3$ to $R^{11}$, $E^1$ and $X^1$ are as follows:

$X^1$ represents oxygen or sulfur;

$E^1$ represents phosphorus, arsenic or antimony;

$R^3$ and $R^4$ each independently represent a hydrocarbon group having 5 to 30 carbon atoms and optionally containing a heteroatom;

$R^5$ to $R^8$ each independently represent a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, $CN$, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2;

$R^9$ to $R^{11}$ each independently represent a hydrogen atom or a hydrocarbon group having 1 to 20 carbon atoms and optionally containing a heteroatom, and wherein, in the general formula (A), Z represents a hydrogen atom or a leaving group, and m represents a valence of Z.

In the metal complex thus obtained, the compound represented by the general formula (A) or (B) becomes a ligand. Therefore, the reaction between the compound represented by the general formula (A) or (B) and the transition metal compound is generally a ligand exchange reaction.

The condition for reacting the compound represented by the general formula (A) or (B) with the transition metal compound, is not particularly limited. When the metal complex thus obtained is thermodynamically more stable than the transition metal compound, the ligand exchange reaction proceeds by mixing the compound represented by the general formula (A) or (B) and the transition metal compound at room temperature (15° C. to 30° C.). On the other hand, when the metal complex thus obtained is thermodynamically less stable than the transition metal compound, to sufficiently develop the ligand exchange reaction, the mixture may be appropriately heated.

It is estimated that the metal complex obtained by reacting the compound represented by the general formula (A) or (B) with the transition metal compound containing the transition metal selected from the nickel or palladium having the structure of the general formula (C), has the structure represented by the below-described general formula (D).

However, since the compound represented by the general formula (A) or (B) is a bidentate ligand, when the compound is reacted with the transition metal compound containing the transition metal selected from the nickel or palladium having the structure of the general formula (C), there is a possibility that a metal complex having a structure other than the structure represented by the general formula (D) is produced. For example, there may be a case where only $X^1$ in the general formula (A) or (B) forms a bond with the transition metal, or a case where only $E^1$ in the formulae forms a bond with the transition metal. The metal complex represented by the general formula (D) is a 1:1 reaction product of the compound represented by the general formula (A) or (B) and the transition metal compound. Depending on the type of the transition metal, there may be a case where a reaction product with a different composition ratio is obtained. For example, there may be a case where two or more molecules of the compound represented by the general formula (A) or (B) form a complex with one transition metal, or there may be a case where one molecule of the compound represented by the general formula (A) or (B) reacts with two or more transition metals to form a polynuclear complex.

In the present invention, it is not denied that the metal complex having a structure other than the structure represented by the general formula (D) can be used for the production of, as with the metal complex represented by the general formula (D), the copolymer of the α-olefin and the (meth)acrylic acid ester.

Hereinafter, the general formulae (A) to (D) will be described.

[General Formula (A)]

$R^3$ and $R^4$ each independently represent a hydrocarbon group having 5 to 30 carbon atoms and optionally containing a heteroatom.

As the heteroatom optionally contained in the hydrocarbon group as $R^3$ and $R^4$, examples include, but are not limited to, oxygen, nitrogen, phosphorus, sulfur, selenium, silicon, halogen and boron.

As the hydrocarbon group having 5 to 30 carbon atoms and optionally containing a heteroatom as $R^3$ and $R^4$, examples include the following groups:

a linear alkyl group such as an n-pentyl group, an n-hexyl group, an n-heptyl group, an n-octyl group, an n-nonyl group and an n-decyl group;

an acyclic alkyl group such as an isopentyl group (a 3-methylbutyl group), a t-pentyl group (a 1,1-dimethylpropyl group), a sec-pentyl group (a 1-methylbutyl group), a 2-methylbutyl group, a neopentyl group (a 2,2-dimethylpropyl group), a 1,2-dimethylpropyl group and an isohexyl group (a 4-methylpentyl group);

an alkenyl group such as a pentenyl group, a hexenyl group, a styryl group and a cinnamyl group;

a cycloalkyl group such as a cyclopentyl group, a 2-methylcyclopentyl group, a 3-methylcyclopentyl group, a cyclohexyl group, a 4-methylcyclohexyl group, a 4-ethylcyclohexyl group, a cyclooctyl group and a decahydronaphthyl group (a bicyclo[4,4,0]decyl group);

an aryl group such as a phenyl group, a naphthyl group, an azulenyl group, a biphenyl group, an anthracenyl group, a terphenyl group, a phenanthrenyl group, a triphenylenyl group, a chrysenyl group, a pyrenyl group and a tetracenyl group;

an arylalkyl group such as a benzyl group, a phenethyl group (a 2-phenylethyl group), a 9-fluorenyl group, a naphthylmethyl group and a 1-tetralinyl group; and an alkylaryl group such as a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group and a dodecylphenyl group.

As the group containing a heteroatom of the hydrocarbon group as $R^3$ and $R^4$, examples include the following groups:

an oxygen-containing group such as an alkoxy group, an aryloxy group, an acyl group and an ester group;

a nitrogen-containing group such as an amino group and an amide group;

a sulfur-containing group such as a thioalkoxy group and thioaryloxy;

a phosphorus-containing substituent such as a phosphino group;

a selenium-containing group such as a selenyl group;

a silicon-containing group such as a trialkylsilyl group, a dialkylarylsilyl group and an alkyldiarylsilyl group;

a fluorine-containing group such as a fluoroalkyl group and a fluoroaryl group; and a boron-containing group such as an alkyl boron group and an aryl boron group.

Of these heteroatom-containing groups, an alkoxy group or an aryloxy group may be used.

The heteroatom contained in the aforementioned heteroatom-containing group, may be one capable of coordinating to a transition metal. Specific examples of the heteroatom-containing group containing such a heteroatom that is capable of coordinating to a transition metal, include the following groups:

an oxygen-containing group such as an alkoxy group (e.g., a methoxy group, an ethoxy group, an n-propoxy group, an isopropoxy group, an n-butoxy group and a t-butoxy group), an aryloxy group (e.g., a phenoxy group, an o-methylphenoxy group and an o-methoxyphenoxy group), an acyl group (e.g., an acetyl group and a benzoyl group) and an ester group (e.g., an acetoxy group, a carboxyethyl group, a carboxy t-butyl group and a carboxyphenyl group);

a nitrogen-containing group such as a dialkylamino group (e.g., a dimethylamino group, a diethylamino group, a di-n-propylamino group and a cyclohexylamino group);

a sulfur-containing group such as a thioalkoxy group (e.g., a thiomethoxy group, a thioethoxy group, a thio-n-propoxy group, a thioisopropoxy group, a thio-n-butoxy group, a thio-t-butoxy group and a thiophenoxy group) and a thioaryloxy group (e.g., an o-methylthiophenoxy group and an o-methoxythiophenoxy group);

a phosphorus-containing substituent such as a dialkylphosphino group (e.g., a dimethylphosphino group, a diethylphosphino group, a di-n-propylphosphino group and a cyclohexylphosphino group); and a selenium-containing group such as a selenyl group (e.g., a methylselenyl group, an ethylselenyl group, an n-propylselenyl group, an n-butylselenyl group, a t-butylselenyl group and a phenylselenyl group).

For the hydrocarbon group as $R^3$ and $R^4$, a part of carbon constituting the carbon framework may be substituted by the heteroatom, one or two or more of the heteroatom-containing groups may be bound to the hydrocarbon group by substitution, or both of them may be employed.

$R^3$ and $R^4$ may be a phenyl group to which one or two or more alkoxy groups are bound by substitution.

As $R^3$ and $R^4$, examples include, but are not limited to, the following case: $R^3$ and $R^4$ are both 2,6-dimethoxyphenyl groups, 2,6-diethoxyphenyl groups or 2,6-diisopropylphenyl groups. Of them, $R^3$ and $R^4$ may be both 2,6-dimethoxyphenyl groups.

$R^5$ to $R^8$ each independently represent (i) a hydrogen atom, (ii) a halogen, (iii) a hydrocarbon group having 1 to 30 carbon atoms and optionally containing a heteroatom, or (iv) an atom or group selected from the group constituting of heteroatom-containing substituents.

The (ii) halogen may be a fluorine atom, a chlorine atom, a bromine atom or an iodine atom.

As the heteroatom optionally contained in the hydrocarbon group as $R^5$ to $R^8$ of the (iii), examples include, but are not limited to, oxygen, nitrogen, phosphorus, sulfur, selenium, silicon, halogen and boron.

As the "group containing a heteroatom" in the hydrocarbon groups of the (iii), in particular, there may be mentioned groups similar to the (iv) heteroatom-containing substituent described below.

In light of the above, as the hydrocarbon group having 1 to 30 carbon atoms and optionally containing a heteroatom as $R^5$ to $R^8$, examples include, but are not limited to, groups exemplified below in (1) to (4).

(1) A linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, and an alkylaryl group having 7 to 30 carbon atoms, etc.

(2) A group in which one or two or more of the heteroatoms are bound to each of the groups in the (1) by substitution (3) A group in which one or two or more of the above-mentioned "groups containing a heteroatom" are bound to each of the groups in the (1) by substitution (4) A group in which one or two or more of the above-mentioned heteroatoms and one or two or more of the above-mentioned "groups containing a heteroatom" are bound to each of the groups in the (1) by substitution For the (3), examples include, but are not limited to, an alkyl group to which an alkoxy group is bound by substitution, and an aryl group to which an ester group is bound by substitution.

In particular, the (iv) heteroatom-containing substituent represents $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, $CN$, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2.

As the hydrocarbon group having 1 to 20 carbon atoms as $R^1$ and $R^2$, examples include the following groups:

a linear alkyl group such as an n-pentyl group, an n-hexyl group, an n-heptyl group, an n-octyl group, an n-nonyl group and an n-decyl group;

an acyclic alkyl group such as an isopentyl group (a 3-methylbutyl group), a t-pentyl group (a 1,1-dimethylpropyl group), a sec-pentyl group (a 1-methylbutyl group), a 2-methylbutyl group, a neopentyl group (a 2,2-dimethylpropyl group), a 1,2-dimethylpropyl group and an isohexyl group (a 4-methylpentyl group);

an alkenyl group such as a pentenyl group, a hexenyl group, a styryl group and a cinnamyl group;

a cycloalkyl group such as a cyclopentyl group, a 2-methylcyclopentyl group, a 3-methylcyclopentyl group, a cyclohexyl group, a 4-methylcyclohexyl group, a 4-ethylcyclohexyl group, a cyclooctyl group and a decahydronaphthyl group (a bicyclo[4,4,0]decyl group);

an aryl group such as a phenyl group, a naphthyl group, an azulenyl group, a biphenyl group, an anthracenyl group, a terphenyl group and a phenanthrenyl group;

an arylalkyl group such as a benzyl group, a phenethyl group (a 2-phenylethyl group), a 9-fluorenyl group, a naphthylmethyl group and a 1-tetralinyl group; and an alkylaryl group such as a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group and a decylphenyl group.

$R^5$ to $R^7$ may each independently represent a hydrogen atom, a fluorine atom, a chlorine atom, a bromine atom, a methyl group, an ethyl group, an isopropyl group, a butyl group, a phenyl group, a trifluoromethyl group, a pentafluorophenyl group, a naphthyl group, an anthracenyl group, a 9-fluorenyl group, a methoxy group, an ethoxy group, a phenoxy group, a sulfonyl group, a nitrile group, a trimethylsilyl group, a triethylsilyl group, a dimethylphenylsilyl group, a trimethoxysilyl group, a triethoxysilyl group, a trimethylsilyloxy group, a trimethoxysiloxy group, a cyclohexylamino group, sodium sulfonate, potassium sulfonate, sodium phosphate or potassium phosphate.

Especially, $R^5$ to $R^7$ may each independently represent a hydrogen atom, a methyl group, an isobutyl group, a tert-butyl group (a t-butyl group), a sec-butyl group, a trifluoromethyl group, a pentafluorophenyl group, a methoxy group, an ethoxy group, a phenoxy group or a nitrile group.

A plurality of groups appropriately selected from $R^5$, $R^6$ and $R^7$ may bind to each other to form an alicyclic ring, an aromatic ring, or a heterocyclic ring containing a heteroatom selected from the group consisting of oxygen, nitrogen and sulfur. In this case, the number of ring members is 5 to 8, and the ring optionally has a substituent thereon.

A plurality of groups contained in $R^5$ may bind to each other to form a ring on $R^5$. The same applies even when $R^6$ or $R^7$ contains a plurality of groups.

$R^8$ may be a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group ($R^1$, $R^2$, M', x and y will not be described here since they are the same as those described above).

The hydrocarbon group having 1 to 30 carbon atoms and optionally containing a heteroatom as $R^8$, may be a group represented by the following general formula (E), for example:

General Formula (E)

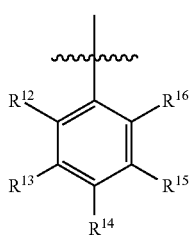

General Formula (F)

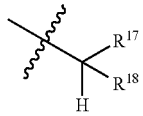

wherein, in the general formula (E), $R^{12}$ to $R^{16}$ each independently represent a hydrogen atom, a substituent represented by the general formula (F) (where $R^{17}$ and $R^{18}$ each independently represent a hydrogen atom or a hydrocarbon group having 1 to 6 carbon atoms and optionally having a heteroatom, and $R^{17}$ and $R^{18}$ may be bound to each other to form a ring), an aryl group having 6 to 12 carbon atoms and optionally having a substituent, an adamantyl group, $OR^2$, $SR^2$ or $N(R^2)_2$; $R^2$ represents a hydrocarbon group having 1 to 20 carbon atoms;

at least one of $R^{12}$ to $R^{16}$ is a substituent represented by the general formula (F), an aryl group having 6 to 12 carbon atoms and optionally having a substituent, an adamantyl group, $OR^2$, $SR^2$ or $N(R^2)_2$; and $R^{12}$ to $R^{16}$ do not form a ring with each other.

As the aryl group having 6 to 12 carbon atoms as $R^{12}$ to $R^{16}$ in the general formula (E), examples include, but are not limited to, a phenyl group, a naphthyl group, an azulenyl group, a biphenyl group, an anthracenyl group, a terphenyl group and a phenanthrenyl group.

As the substituent of the aryl group as $R^{12}$ to $R^{16}$, examples include, but are not limited to, a methyl group, an ethyl group, an isopropyl group, a butyl group, a methoxy group and an ethoxy group.

As the heteroatom in the general formula (F), examples include, but are not limited to, oxygen, nitrogen, phosphorus, sulfur, selenium, silicon, halogen and boron.

As the hydrocarbon group having 1 to 6 carbon atoms and optionally having a heteroatom as $R^{17}$ and $R^{18}$ in the general formula (F), examples include the following substituents.

$R^{17}$ and $R^{18}$ may each independently represent a linear alkyl group having 1 to 6 carbon atoms such as a methyl group, an ethyl group, an n-propyl group, an n-butyl group, an n-pentyl group and an n-hexyl group.

$R^{17}$ and $R^{18}$ may each independently represent a branched acyclic alkyl group having 3 to 6 carbon atoms such as an isopropyl group, an isobutyl group, a tert-butyl group (a t-butyl group), a sec-butyl group, an isopentyl group (a 3-methylbutyl group), a t-pentyl group (a 1,1-dimethylpropyl group), a sec-pentyl group (a 1-methylbutyl group), a 2-methylbutyl group, a neopentyl group (a 2,2-dimethylpropyl group), a 1,2-dimethylpropyl group and an isohexyl group (a 4-methylpentyl group).

$R^{17}$ and $R^{18}$ may each independently represent an alkenyl group having 2 to 6 carbon atoms such as a vinyl group, an allyl group, a butenyl group, a pentenyl group and a hexenyl group.

$R^{17}$ and $R^{18}$ may each independently represent an alkenyl group having 3 to 6 carbon atoms such as an allyl group, a butenyl group, a pentenyl group and a hexenyl group.

$R^{17}$ and $R^{18}$ may form a ring with each other to be a cycloalkyl group having 3 to 10 carbon atoms and optionally having a side chain, such as a cyclopropyl group, a cyclobutyl group, a cyclopentyl group, a 2-methylcyclopentyl group, a 3-methylcyclopentyl group, a cyclohexyl group, a 4-methylcyclohexyl group, a 4-ethylcyclohexyl group, a cyclooctyl group and a decahydronaphthyl group (a bicyclo[4,4,0]decyl group).

For the hydrocarbon group as $R^{17}$ and $R^{18}$, a part of carbon constituting the carbon framework may be substituted by the heteroatom, one or two or more heteroatom-containing groups may be bound to the hydrocarbon group by substitution, or both of them may be employed. The heteroatom-containing groups may be the same groups as the above-described $R^3$ and $R^4$.

At least one of $R^{12}$ to $R^{16}$ in the general formula (E) may be a substituent represented by the general formula (F), an aryl group having 6 to 12 carbon atoms and optionally having a substituent, or an adamantyl group.

$R^{12}$ and $R^{16}$ in the general formula (E) may be a substituent represented by the general formula (F), an aryl group having 6 to 12 carbon atoms and optionally having a substituent, an adamantyl group, $OR^2$, $SR^2$ or $N(R^2)_2$.

Also, $R^{12}$ and $R^{16}$ in the general formula (E) may be a substituent represented by the general formula (F), an aryl group having 6 to 12 carbon atoms and optionally having a substituent, or an adamantyl group.

As $R^{12}$ and $R^{16}$, examples include a methyl group in which $R^{17}$ and $R^{18}$ in the general formula (F) are both hydrogen atoms, or an isopropyl group in which $R^{17}$ and $R^{18}$ are both methyl groups.

As $R^{13}$ to $R^{15}$, examples include a hydrogen atom.

Also in the general formula (E), $R^{12}$ and $R^{16}$ are both methyl groups or isopropyl groups, and $R^{13}$ to $R^{15}$ are all hydrogen atoms.

As the group represented by the general formula (E), examples include, but are not limited to, a 2,6-dimethylphenyl group, a 2,6-diethylphenyl group, and a 2,6-diisopropylphenyl group. Of them, the group represented by the general formula (E) may be a 2,6-dimethylphenyl group or a 2,6-diisopropylphenyl group.

$R^8$ may be a fluorine atom, a chlorine atom, a bromine atom, a methyl group, an ethyl group, an isopropyl group, an isobutyl group, a tert-butyl group (a t-butyl group), a sec-butyl group, a 2,6-dimethylphenyl group, a 2,6-diisopropylphenyl group, a trifluoromethyl group, a pentafluorophenyl group, a naphthyl group, an anthracenyl group, a 9-fluorenyl group, a methoxy group, an ethoxy group, a phenoxy group, a sulfonyl group, a nitrile group, a trimethylsilyl group, a triethylsilyl group, a dimethylphenylsilyl group, a trimethoxysilyl group, a triethoxysilyl group, a trimethylsilyloxy group, a trimethoxysiloxy group, a cyclohexylamino group, sodium sulfonate, potassium sulfonate, sodium phosphate or potassium phosphate.

Also, $R^8$ may be a methyl group, an isobutyl group, a tert-butyl group (a t-butyl group), a sec-butyl group, a 2,6-dimethylphenyl group, an 2,6-diisopropylphenyl group, a trifluoromethyl group, a pentafluorophenyl group, an anthracenyl group, a 9-fluorenyl group, a methoxy group, an ethoxy group, a phenoxy group, a trimethoxysilyl group or a nitrile group.

$E^1$ represents phosphorus, arsenic or antimony. Since these elements belong to Group 15 in the periodic table and are similar in nature, similar effects are expected to be obtained. Of them, $E^1$ may be phosphorus from the viewpoint of ease of handling.

$X^1$ represents oxygen or sulfur. Of them, $X^1$ may be oxygen.

Z represents a hydrogen atom or a leaving group. As Z, examples include, but are not limited to, a hydrogen atom.

Also, m represents the valence of Z.

[General Formula (B)]

The general formula (B) is shown in the form of anion. As the countercation thereof, any cation can be used, so long as the cation does not inhibit the reaction with the transition metal compound of the present invention.

Specific examples of the countercation include ammonium, quaternary ammonium, phosphonium, and metal ions of Groups 1 to 14 in the periodic table.

Of these cations, the countercation may be $NH_4^+$, $R^2_4N^+$ (where $R^2$ is as aforementioned, and four Res may be the same or different from each other (the same shall apply hereinafter)), $R^2_4P^+$, $Li^+$, $Na^+$, $K^+$, $Mg^{2+}$, $Ca^{2+}$ or $Al^{3+}$. Also, the countercation may be $R^2_4N^+$, $Li^+$, $Na^+$ or $K^+$.

The compound represented by the general formula (A) or (B) can be synthesized by a known synthesis method.

[General Formula (C)]

The general formula (C) is shown in the form of anion. The countercation thereof is a nickel(II) ion or a palladium (II) ion.

In the general formula (C), $R^9$ to $R^{11}$ each independently represent a hydrogen atom or a hydrocarbon group having 1 to 20 carbon atoms and optionally containing a heteroatom.

As the heteroatom optionally contained in the hydrocarbon group as $R^9$ to $R^{11}$, examples include, but are not limited to, oxygen, nitrogen, phosphorus, sulfur, selenium, silicon, halogen and boron.

As the hydrocarbon group having 1 to 20 carbon atoms as $R^9$ to $R^{11}$, examples include the following groups:

a linear alkyl group such as an n-pentyl group, an n-hexyl group, an n-heptyl group, an n-octyl group, an n-nonyl group and an n-decyl group;

an acyclic alkyl group such as an isopentyl group (a 3-methylbutyl group), a t-pentyl group (a 1,1-dimethylpropyl group), a sec-pentyl group (a 1-methylbutyl group), a 2-methylbutyl group, a neopentyl group (a 2,2-dimethylpropyl group), a 1,2-dimethylpropyl group and an isohexyl group (a 4-methylpentyl group);

an alkenyl group such as a pentenyl group, a hexenyl group, a styryl group and a cinnamyl group;

a cycloalkyl group such as a cyclopentyl group, a 2-methylcyclopentyl group, a 3-methylcyclopentyl group, a cyclohexyl group, a 4-methylcyclohexyl group, a 4-ethylcyclohexyl group, a cyclooctyl group and a decahydronaphthyl group (a bicyclo[4,4,0]decyl group);

an aryl group such as a phenyl group, a naphthyl group, an azulenyl group, a biphenyl group, an anthracenyl group, a terphenyl group and a phenanthrenyl group;

an arylalkyl group such as a benzyl group, a phenethyl group (a 2-phenylethyl group), a 9-fluorenyl group, a naphthylmethyl group and a 1-tetralinyl group; and an alkylaryl group such as a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group and a decylphenyl group.

For the hydrocarbon group as $R^9$ to $R^{11}$, a part of carbon constituting the carbon framework may be substituted by the heteroatom, one or two or more heteroatom-containing groups may be bound to the hydrocarbon group by substitution, or both of them may be employed. The heteroatom-containing groups may be the same groups as the above-described $R^3$ and $R^4$.

In the general formula (C), especially, $R^9$ and $R^{11}$ may be methyl groups, and $R^{10}$ may be a hydrogen atom.

As for the transition metal compound used in the present invention, those which are capable of reacting with a compound represented by the general formula (A) or (B) to form a complex having polymerizing ability, are used. They are sometimes referred to as precursor.

As the transition metal compound containing the transition metal selected from the nickel or palladium having the structure of the general formula (C), examples include, but are not limited to, bis(acetylacetonato)nickel(II), bis(acetylacetonato)palladium(II), bis(2,2,6,6-tetramethyl-3,5-heptanedionato)nickel(II), bis[1-(4-methylphenyl)-1,3-butanedionato]nickel(II), bis(1,1,1-trifluoro-2,4-pentanedionato)nickel(II), bis(hexafluoroacetylacetonato)nickel(II), bis(6-methyl-2,4-heptanedionato)nickel(II), bis(1-phenyl-1,3-butanedionato)nickel(II) and bis[4,4,4-trifluoro-1-(2-furanyl)-1,3-butanedionato]nickel(II).

[General Formula (D)]

The metal complex of the present invention is a metal complex represented by the following general formula (D):

General Formula (D)

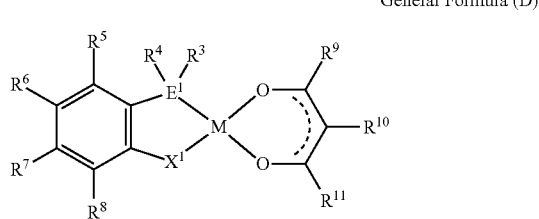

wherein $R^3$ to $R^{11}$, $E^1$, $X^1$ and M are as follows:
M represents nickel or palladium;
$X^1$ represents oxygen or sulfur;
$E^1$ represents phosphorus, arsenic or antimony;
$R^3$ and $R^4$ each independently represent a hydrocarbon group having 5 to 30 carbon atoms and optionally containing a heteroatom;
$R^5$ to $R^8$ each independently represent a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2; and
$R^9$ to $R^{11}$ each independently represent a hydrogen atom or a hydrocarbon group having 1 to 20 carbon atoms and optionally containing a heteroatom.

The metal complex represented by the general formula (D) of the present invention, is contained in a product obtained by reacting the compound represented by the general formula (A) or (B) with the transition metal compound containing the transition metal selected from the nickel or palladium having the structure of the general formula (C). However, as described above, the structure of the metal complex obtained by the reaction is not limited to the structure represented by general formula (D).

$R^3$ to $R^{11}$, $E^1$ and $X^1$ in the general formula (D) are as described above in [General Formula (A)], [General Formula (B)] and [General Formula (C)]. As just described, there are similarities between the complex structure of the metal complex in the reaction product and that of the metal complex represented by the general formula (D), in terms of the main skeleton containing a benzene ring and these substituents ($R^3$ to $R^{11}$, $E^1$ and $X^1$).

Hereinafter, M in the general formula (D) will be described.

In the present invention, M is nickel or palladium.

The valence of M may be divalent. The valence of M means a formal oxidation number used in the organometallic chemistry. That is, when an electron pair in a bond in which a certain element 1 is involved, is assigned to an element 2 having greater electronegativity, the valence means a number of charge remaining on an atom of the element 1.

The divalent transition metal may be nickel (II) or palladium (II), for example.

The following Tables 1 to 3 show the specific combinations of the substituents, etc., in the general formula (D) of the present invention. However, specific examples are not limited to the following examples. In the following examples, Me means methyl group; Et means ethyl group; nPr means normal propyl group; iPr means isopropyl group; nBu means normal butyl group; tBu means tertiary butyl group; Cy means cyclohexyl group; Ph means phenyl group; and Ad means adamantyl group.

TABLE 1

| R3 | R4 | R5 | R9 | R10 | R11 | (Note) Metal source of commertial products |
| --- | --- | --- | --- | --- | --- | --- |
| 2,6-(OMe)$_2$Ph | 2,6-(OMe)$_2$Ph | Carbazolyl | Me | H | Me | Nickel(II) acetylacetonate |
| 2,6-(OMe)$_2$Ph | 2,6-(OMe)$_2$Ph | Adamantyl | Me | H | Me | Nickel(II) acetylacetonate |
| 2,6-(OMe)$_2$Ph | 2,6-(OMe)$_2$Ph | Methoxy | Me | H | Me | Nickel(II) acetylacetonate |
| 2,6-(OMe)$_2$Ph | 2,6-(OMe)$_2$Ph | Cyclohexyl | Me | H | Me | Nickel(II) acetylacetonate |
| 2,6-(OMe)$_2$Ph | 2,6-(OMe)$_2$Ph | Trimethylsilyl | Me | H | Me | Nickel(II) acetylacetonate |
| 2,6-(OMe)$_2$Ph | 2,6-(OMe)$_2$Ph | Trimethylsilyloxy | Me | H | Me | Nickel(II) acetylacetonate |
| 2,6-(OMe)$_2$Ph | 2,6-(OMe)$_2$Ph | Cyololhexylamino | Me | H | Me | Nickel(II) acetylacetonate |
| 2,6-(OMe)$_2$Ph | 2,6-(OMe)$_2$Ph | tBu | Me | H | Me | Nickel(II) acetylacetonate |
| 2,6-(OMe)$_2$Ph | 2,6-(OMe)$_2$Ph | Carbezolyl | tBu | H | tBu | Bis(2,2,6,6-tetramethyl-3,5-heptanedionato)nickel(II) |
| 2,6-(OMe)$_2$Ph | 2,6-(OMe)$_2$Ph | Adamantyl | 4-Methylphenyl | H | Me | Bis[1-(4-methylphenyl)-1,3-butanedionato]nickel(II) |
| 2,6-(OMe)$_2$Ph | 2,6-(OMe)$_2$Ph | Methoxy | Trifluoromethyl | H | Me | Bis(1,1,1-Trifluoro-2,4-Pentanedionato)nickel(II) |
| 2,6-(OMe)$_2$Ph | 2,6-(OMe)$_2$Ph | Cyclohexyl | Trifluoromethyl | H | Trifluoromethyl | Bis(hexafluoroacetylacetonato)nickel(II) |
| 2,6-(OMe)$_2$Ph | 2,6-(OMe)$_2$Ph | Trimethylsilyl | tBu | H | tBu | Palladium(II) acetylatetonate |
| 2,6-(OMe)$_2$Ph | 2,6-(OMe)$_2$Ph | Trimethylsilyloxy | iBu | H | Me | Bis(6-methyl-2,4-heptanedionato)nickel(II) |
| 2,6-(OMe)$_2$Ph | 2,6-(OMe)$_2$Ph | Cyclohexylamino | Ph | H | Me | Bis(1-phenyl-1,3-butanedonato)nickel(II) |
| 2,6-(OMe)$_2$Ph | 2,6-(OMe)$_2$Ph | tBu | Trifluorormethyl | H | Furanyl | Bis[4,4,-trifluoro-1-(2-furanyl)-1,3-butanedionato]nickel(II) |

TABLE 2

| R3 | R4 | R9 | R11 | R11 | R12 | R13 | R14 | R15 | R16 |
| --- | --- | --- | --- | --- | --- | --- | --- | --- | --- |
| 2,6-(MeO)$_2$Ph | 2,6-(MeO)$_2$Ph | Me | H | Me | H | H | H | H | H |
| 2,6-(MeO)$_2$Ph | 2,6-(MeO)$_2$Ph | Me | H | Me | F | F | F | F | F |
| 2,6-(MeO)$_2$Ph | 2,6-(MeO)$_2$Ph | Me | H | Me | Me | H | H | H | Me |
| 2,6-(MeO)$_2$Ph | 2,6-(MeO)$_2$Ph | Me | H | Me | Et | H | H | H | Et |
| 2,6-(MeO)$_2$Ph | 2,6-(MeO)$_2$Ph | Me | H | Me | $^n$Pr | H | H | H | $^n$Pr |
| 2,6-(MeO)$_2$Ph | 2,6-(MeO)$_2$Ph | Me | H | Me | $^i$Pr | H | H | H | $^i$Pr |

TABLE 2-continued

| R3 | R4 | R9 | R11 | R11 | R12 | R13 | R14 | R15 | R16 |
|---|---|---|---|---|---|---|---|---|---|
| 2,6-(MeO)$_2$Ph | 2,6-(MeO)$_2$Ph | Me | H | Me | $^n$Bu | H | H | H | $^n$Bu |
| 2,6-(MeO)$_2$Ph | 2,6-(MeO)$_2$Ph | Me | H | Me | Cy | H | H | H | Cy |
| 2,6-(MeO)$_2$Ph | 2,6-(MeO)$_2$Ph | Me | H | Me | Ph | H | H | H | Ph |
| 2,6-(MeO)$_2$Ph | 2,6-(MeO)$_2$Ph | Me | H | Me | 2,6-Me$_2$Ph | H | H | H | 2,6-Me$_2$Ph |
| 2,6-(MeO)$_2$Ph | 2,6-(MeO)$_2$Ph | Me | H | Me | 2,6-(MeO)$_2$Ph | H | H | H | 2,6-(MeO)$_2$Ph |
| 2,6-(MeO)$_2$Ph | 2,6-(MeO)$_2$Ph | Me | H | Me | 2,6-(PhO)$_2$Ph | H | H | H | 2,6-(PhO)$_2$Ph |
| 2,6-(MeO)$_2$Ph | 2,6-(MeO)$_2$Ph | Me | H | Me | Ad | H | H | H | Ad |
| 2,6-(MeO)$_2$Ph | 2,6-(MeO)$_2$Ph | Me | H | Me | OMe | H | H | H | OMe |
| 2,6-(MeO)$_2$Ph | 2,6-(MeO)$_2$Ph | Me | H | Me | OEt | H | H | H | OEt |
| 2,6-(MeO)$_2$Ph | 2,6-(MeO)$_2$Ph | Me | H | Me | OiPr | H | H | H | O$^i$Pr |
| 2,6-(MeO)$_2$Ph | 2,6-(MeO)$_2$Ph | Me | H | Me | OtBu | H | H | H | O$^t$Bu |
| 2,6-(MeO)$_2$Ph | 2,6-(MeO)$_2$Ph | Me | H | Me | SMe | H | H | H | SMe |
| 2,6-(MeO)$_2$Ph | 2,6-(MeO)$_2$Ph | Me | H | Me | NMe$_2$ | H | H | H | NMe$_2$ |
| 2,6-(MeO)$_2$Ph | 2,6-(MeO)$_2$Ph | Me | H | Me | H | Me | H | Me | H |
| 2,6-(MeO)$_2$Ph | 2,6-(MeO)$_2$Ph | Me | H | Me | H | Et | H | Et | H |
| 2,6-(MeO)$_2$Ph | 2,6-(MeO)$_2$Ph | Me | H | Me | H | $^n$Pr | H | $^n$Pr | H |
| 2,6-(MeO)$_2$Ph | 2,6-(MeO)$_2$Ph | Me | H | Me | H | $^i$Pr | H | $^i$Pr | H |
| 2,6-(MeO)$_2$Ph | 2,6-(MeO)$_2$Ph | Me | H | Me | H | $^n$Bu | H | $^n$Bu | H |
| 2,6-(MeO)$_2$Ph | 2,6-(MeO)$_2$Ph | Me | H | Me | H | Cy | H | Cy | H |
| 2,6-(MeO)$_2$Ph | 2,6-(MeO)$_2$Ph | Me | H | Me | H | Ph | H | Ph | H |
| 2,6-(MeO)$_2$Ph | 2,6-(MeO)$_2$Ph | Me | H | Me | H | 2,6-Me$_2$Ph | H | 2 6-Me$_2$Ph | H |
| 2,6-(MeO)$_2$Ph | 2,6-(MeO)$_2$Ph | Me | H | Me | H | 2,6-(MeO)$_2$Ph | H | 2,19-(MeO)$_2$Ph | H |
| 2,6-(MeO)$_2$Ph | 2,6-(MeO)$_2$Ph | Me | H | Me | H | 2,6-(PhO)$_2$Ph | H | 2,6-(PhO)$_2$Ph | H |

TABLE 3

| R3 | R4 | R9 | R10 | R11 | R12 | R13 | R14 | R15 | R16 |
|---|---|---|---|---|---|---|---|---|---|
| 2,6-(MeO)$_2$Ph | 2,6-(MeO)$_2$Ph | Me | H | Me | H | Ad | H | Ad | H |
| 2,6-(MeO)$_2$Ph | 2,6-(MeO)$_2$Ph | Me | H | Me | H | OMe | H | OMe | H |
| 2,6-(MeO)$_2$Ph | 2,6-(MeO)$_2$Ph | Me | H | Me | H | OEt | H | OEt | H |
| 2,6-(MeO)$_2$Ph | 2,6-(MeO)$_2$Ph | Me | H | Me | H | O$^i$Pr | H | O$^i$Pr | H |
| 2,6-(MeO)$_2$Ph | 2,6-(MeO)$_2$Ph | Me | H | Me | H | O$^t$Bu | H | O$^t$Bu | H |
| 2,6-(MeO)$_2$Ph | 2,6-(MeO)$_2$Ph | Me | H | Me | H | SMe | H | SMe | H |
| 2,6-(MeO)$_2$Ph | 2,6-(MeO)$_2$Ph | Me | H | Me | H | NMe$_2$ | H | NMe$_2$ | H |
| 2,6-(MeO)$_2$Ph | 2,6-(MeO)$_2$Ph | Me | H | Me | H | H | Me | H | H |
| 2,6-(MeO)$_2$Ph | 2,6-(MeO)$_2$Ph | Me | H | Me | H | H | Et | H | H |
| 2,6-(MeO)$_2$Ph | 2,6-(MeO)$_2$Ph | Me | H | Me | H | H | $^n$Pr | H | H |
| 2,6-(MeO)$_2$Ph | 2,6-(MeO)$_2$Ph | Me | H | Me | H | H | $^i$Pr | H | H |
| 2,6-(MeO)$_2$Ph | 2,6-(MeO)$_2$Ph | Me | H | Me | H | H | $^n$Bu | H | H |
| 2,6-(MeO)$_2$Ph | 2,6-(MeO)$_2$Ph | Me | H | Me | H | H | Cy | H | H |
| 2,6-(MeO)$_2$Ph | 2,6-(MeO)$_2$Ph | Me | H | Me | H | H | Ph | H | H |
| 2,6-(MeO)$_2$Ph | 2,6-(MeO)$_2$Ph | Me | H | Me | H | H | 2,6-Me$_2$Ph | H | H |
| 2,6-(MeO)$_2$Ph | 2,6-(MeO)$_2$Ph | Me | H | Me | H | H | 2,6-(MeO)$_2$Ph | H | H |
| 2,6-(MeO)$_2$Ph | 2,6-(MeO)$_2$Ph | Me | H | Me | H | H | 2,5-Me$_2$Ph | H | H |
| 2,6-(MeO)$_2$Ph | 2,6-(MeO)$_2$Ph | Me | H | Me | H | H | Ad | H | H |
| 2,6-(MeO)$_2$Ph | 2,6-(MeO)$_2$Ph | Me | H | Me | H | H | OMe | H | H |
| 2,6-(MeO)$_2$Ph | 2,6-(MeO)$_2$Ph | Me | H | Me | H | H | OEt | H | H |
| 2,6-(MeO)$_2$Ph | 2,6-(MeO)$_2$Ph | Me | H | Me | H | H | O$^i$Pr | H | H |
| 2,6-(MeO)$_2$Ph | 2,6-(MeO)$_2$Ph | Me | H | Me | H | H | O$^t$Bu | H | H |
| 2,6-(MeO)$_2$Ph | 2,6-(MeO)$_2$Ph | Me | H | Me | H | H | SMe | H | H |
| 2,6-(MeO)$_2$Ph | 2,6-(MeO)$_2$Ph | Me | H | Me | H | H | NMe$_2$ | H | H |
| 2,6-(MeO)$_2$Ph | 2,6-(MeO)$_2$Ph | Me | H | Me | $^i$Pr | H | $^i$Pr | H | $^i$Pr |
| 2,6-(MeO)$_2$Ph | 2,6-(MeO)$_2$Ph | Me | H | Me | $^i$Pr | H | $^i$Pr | H | $^i$Pr |
| 2,6-(MeO)$_2$Ph | 2,6-(MeO)$_2$Ph | Me | H | Me | $^i$Pr | H | $^i$Pr | H | $^i$Pr |
| 2,6-(MeO)$_2$Ph | 2,6-(MeO)$_2$Ph | Me | H | Me | $^i$Pr | H | H | H | $^i$Pr |
| 2,6-(MeO)$_2$Ph | 2,6-(MeO)$_2$Ph | Me | H | Me | $^i$Pr | H | H | H | $^i$Pr |
| 2,6-(MeO)$_2$Ph | 2,6-(MeO)$_2$Ph | Me | H | Me | $^i$Pr | H | H | H | $^i$Pr |

2. Method for Producing Metal Complex

In the present invention, as described above, the metal complex represented by the general formula (D) can be produced by reacting the compound represented by the general formula (A) or (B) with the transition metal compound containing the transition metal selected from the nickel or palladium having the structure of the general formula (C).

The reaction product of the present invention can be obtained by reacting the compound represented by the general formula (A) or (B) with the transition metal compound (C) at a molar ratio of ((A) or (B)):(C)=1:99 to 99:1 in an organic solvent such as toluene and benzene at 0° C. to 100° C. under reduced or applied pressure for 1 second to 86,400 seconds.

After the reaction, a component constructing the transition metal compound and being a component other than the transition metal of the compound, is substituted by a part of the general formula (A) excluding Z or the compound represented by the general formula (B) to form the metal complex represented by the general formula (D) of the present invention.

This substitution reaction preferably proceeds quantitatively; however, in some cases, it may proceed incompletely.

After completion of the reaction, in addition to the complex represented by the general formula (D), other components derived from the general formulae (A) and (B) and the transition metal compound are present. These other components may be removed or left when the copolymerization reaction of the present invention is carried out. Generally, these other components may be removed because higher activity can be obtained.

In the present invention, the complex forming reaction may be carried out in advance in a vessel other than the reactor which is used for polymerization of α-olefin or copolymerization of α-olefin and (meth)acrylate, and then the thus-obtained complex represented by the general formula (D) may be used for polymerization of α-olefin or copolymerization of α-olefin and (meth)acrylate, or the complex forming reaction may be carried out in the presence of these monomers.

Also, the complex forming reaction may be carried out in the reactor which is used for polymerization of α-olefin or copolymerization of α-olefin and (meth)acrylate. In this case, these monomers may be present or absent. As each of the components represented by the general formulae (A) and (B), a single component may be used, or plural kinds of components may be used in combination.

3. Olefin Polymerization Catalyst

The olefin polymerization catalyst of the present invention contains the following components (a) and (b).

Component (a): The above-described metal complex
Component (b): An organoaluminum compound The component (a) is the above-described metal complex. As the component (a), only one kind of metal complex may be used, or a combination of two or more kinds of metal complexes may be used.

In the present invention, the metal complex represented by the general formula (D) can be used as a catalyst component for polymerization or copolymerization.

As aforementioned, the metal complex represented by the general formula (D) can be formed by reacting the compound having the structure of the general formula (A) or (B) with the transition metal compound having the structure of the general formula (C).

When the metal complex represented by the general formula (D) is used as a catalyst component, isolated one may be used, or one supported on a carrier may be used.

The supporting of the metal complex on the carrier may be carried out in a reactor which is used for polymerization of α-olefin or copolymerization of α-olefin and (meth)acrylate, in the presence or the absence of these monomers, or may be carried out in a vessel other than the reactor.

As a usable carrier, any carrier can be used so long as the carrier does not impair the scope of the present invention. Generally, inorganic oxides, polymer carriers and the like can be suitably used. In particular, there may be mentioned $SiO_2$, $Al_2O_3$, MgO, $ZrO_2$, $TiO_2$, $B_2O_3$, CaO, ZnO, BaO, $ThO_2$ and the like, or mixtures thereof. Also, mixed oxides such as $SiO_2$—$Al_2O_3$, $SiO_2$—$V_2O_5$, $SiO_2$—$TiO_2$, $SiO_2$—MgO and $SiO_2$—$Cr_2O_3$ can be used. Also, inorganic silicate, polyethylene carrier, polypropylene carrier, polystyrene carrier, polyacrylic acid carrier, polymethacrylic acid carrier, polyacrylic acid ester carrier, polyester carrier, polyamide carrier, polyimide carrier, and the like can be used. As for these carriers, particle diameter, particle diameter distribution, pore volume, specific surface area and the like are not particularly limited, and any carrier can be used.

As the inorganic silicate, clay, clay mineral, zeolite, diatomaceous earth and the like can be used. For these substances, synthetic material may be used, or naturally occurring mineral may be used.

Specific examples of clay and clay mineral include an allophane group such as allophane; a kaoline group such as dickite, nacrite, kaolinite and anorthite; a halloysite group such as metahalloysite and halloysite; a serpentine group such as chrysotile, lizardite and antigorite; smectite such as montmorillonite, zaukonite, beidellite, nontronite, saponite and hectorite; vermiculite minerals such as vermiculite; mica minerals such as illite, sericite and glauconite; attapulgite; sepiolite; palygorskite; bentnite; Kibushi clay; Gaerome clay; hisingerite; pyrophyllite; and a chlorite group. These substances may form a mixed layer.

Artificial compounds include synthetic mica, synthetic hectorite, synthetic saponite and synthetic taeniolite.

Of these specific examples, especially, a kaoline group such as dickite, nacrite, kaolinite and anorchisite; a halloysite group such as metahalloysite and halloysite; a serpentine group such as chrysotile, lizardite and antigorite; smectite such as montmorillonite, zaukonite, beidellite, nontronite, saponite and hectorite; vermiculite minerals such as vermiculite; mica minerals such as illite, sericite and glauconite; synthetic mica; synthetic hectorite; synthetic saponite; and synthetic taeniolite, may be used. Also, smectite such as montmorillonite, zaukonite, beidellite, nontronite, saponite and hectorite; vermiculite minerals such as vermiculite; synthetic mica; synthetic hectorite; synthetic saponite; and synthetic taeniolite may be used.

These carriers may be used as they are, or may be subjected to acid treatment with hydrochloric acid, nitric acid, sulfuric acid or the like, and/or salts treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, $Al_2(SO_4)_3$ or the like. The treatment may be carried out by mixing corresponding acid and base to form a salt in the reaction system. Also, shape control such as pulverization and granulation or drying treatment may be carried out.

An example of the organoaluminum compound used as the component (b) is represented by the following general formula (G):

$$Al(R^P)_a X_{(3-a)} \qquad \text{General Formula (G)}$$

where $R^P$ represents a hydrocarbon group having 1 to 20 carbon atoms; X represents a hydrogen atom, a halogen, an alkoxy group or a siloxy group; and a is a number that is more than 0 and equal to or less than 3.

Specific examples of the organoaluminum compound represented by the general formula (G) include trialkylaluminum such as trimethylaluminum, triethylaluminum, tripropylaluminum, triisobutylaluminum and the like, and halogen- or alkoxy-containing alkylaluminum such as diethylaluminum monochloride, diethylaluminum monomethoxide and the like.

Of them, the organoaluminum compound may be triisobutylaluminum. Also, two or more kinds of the aforementioned organoaluminum compounds may be used in combination. Also, the aforementioned organoaluminum compound may be modified with alcohol, phenol or the like for use. As the modifiers, methanol, ethanol, 1-propanol, isopropanol, butanol, phenol, 2,6-dimethylphenol, 2,6-di-t-butylphenol and the like are exemplified. Of them, the organoaluminum compound may be 2,6-dimethylphenol, 2,6-di-t-butylphenol and the like.

An example of the organoaluminum compound as the component (b) is an organoaluminum oxy compound.

The organoaluminum oxy compound has an Al—O—Al bond in molecule, and the number of the bonds is in a range of generally from 1 to 100. Especially, it may be in a range of from 1 to 50.

Such an organoaluminum oxy compound is generally a product obtainable by reacting an organoaluminum compound with water.

The reaction of the organoaluminum compound with water is generally carried out in inert hydrocarbon (solvent). As the inert hydrocarbon, aliphatic hydrocarbon, alicyclic hydrocarbon and aromatic hydrocarbon such as pentane, hexane, heptane, cyclohexane, methylcyclohexane, benzene, toluene and xylene, can be used. Aliphatic hydrocarbon or aromatic hydrocarbon may be used.

As the organoaluminum compound used for preparation of the organoaluminum oxy compound, compounds represented by the following general formula (H) are usable. The organoaluminum compound may be trialkylaluminum.

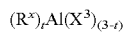      General Formula (H)

(where $R^x$ represents a hydrocarbon group such as an alkyl group, an alkenyl group, an aryl group and an aralkyl group each having 1 to 18 carbon atoms; $X^3$ represents a hydrogen atom or a halogen; and t represents an integer of $1 \leq t \leq 3$.)

As the alkyl group in the trialkylaluminum, examples include, but are not limited to, a methyl group, an ethyl group, a propyl group, an isopropyl group, a butyl group, an isobutyl group, a pentyl group, a hexyl group, an octyl group, a decyl group and a dodecyl group. The alkyl group may be a methyl group and an isobutyl group, and of them, the alkyl group may be a methyl group. Two or more kinds of the organoaluminum compounds can be mixed and used.

The reaction ratio of the water and the organoaluminum compound (the molar ratio of water/Al) may be from 0.25/1 to 1.2/1, and particularly from 0.5/1 to 1/1. The reaction temperature is generally in a range of from −70° C. to 100° C., and may be from −20° C. to 20° C. The reaction time is generally selected in a range of from 5 minutes to 24 hours, and may be from 10 minutes to 5 hours. As the water required for the reaction, not only simple water but also crystallization water contained in copper sulfate hydrate, aluminum sulfate hydrate and the like, and a component that can produce water in the reaction system, etc., can be used.

Of the aforementioned organoaluminum oxy compounds, one that is obtainable by reaction of alkylaluminum and water is generally referred to as aluminoxane. Methylaluminoxane (including a mixture substantially composed of methylaluminoxane (MAO)) is particularly preferred as the organoaluminum oxy compound. Dried methylaluminoxane (DMAO) in a solid form, which is obtained by removing a solvent out of a MAO solution, is also preferred.

As the organoaluminum oxy compound, two or more kinds of the aforementioned organoaluminum oxy compounds can be used in combination, or a solution of the organoaluminum oxy compound dissolved or dispersed in the aforementioned inert hydrocarbon solvent, may be used.

In the method for preparing the olefin polymerization catalyst of the present invention, the method for contacting the components (a) and (b) is not particularly limited.

The contacting of the components (a) and (b) may be carried out in a reactor which is used for polymerization of α-olefin or copolymerization of α-olefin and (meth)acrylate, in the presence or the absence of these monomers, or may be carried out in a vessel other than the reactor. The contacting may be carried out under an inert gas atmosphere such as nitrogen and the like and in an inert hydrocarbon solvent such as pentane, hexane, heptane, toluene, xylene and the like. The contacting may be carried out at a temperature between −20° C. and the boiling point of the solvent, and it may be carried out at a temperature between room temperature and the boiling point of the solvent.

4. Method for Producing α-Olefin/(Meth)Acrylic Acid Ester Copolymer

The method for producing the α-olefin/(meth)acrylic acid ester copolymer according to the present invention, is a method wherein an α-olefin and a (meth)acrylic acid ester are copolymerized in the presence of the olefin polymerization catalyst.

In the present Description, "(meth)acrylic" means "acrylic or methacrylic". That is, for example, the description of "(meth)acrylic acid" is used for the same meaning as "acrylic acid or methacrylic acid".

In an embodiment of the method for producing the α-olefin/(meth)acrylic acid ester copolymer according to the present invention, an α-olefin and a (meth)acrylic acid ester monomer are copolymerized in the presence of the polymerization catalyst.

The α-olefin in the present invention is represented by the following general formula (I): $CH_2=CHR^w$. $R^w$ is a hydrogen atom or a hydrocarbon group having 1 to 20 carbon atoms, which may have a branch, ring, unsaturated bond and the like. When the number of the carbon atoms of $R^w$ is larger than 20, polymerization activity tends to be less expressed. For this reason, in particular, there may be mentioned α-olefins in which $R^w$ is a hydrogen atom or a hydrocarbon group having 1 to 10 carbon atoms.

As the α-olefin, examples include, but are not limited to, ethylene, propylene, 1-butene, 1-pentene, 1-hexene, 1-octene, 1-decene, 3-methyl-1-butene, 4-methyl-1-pentene, vinylcyclohexene and styrene. A single α-olefin may be used, or plural kinds of α-olefins may be used in combination.

In the method for producing the α-olefin/(meth)acrylic acid ester copolymer according to the present invention, the α-olefin may be an ethylene.

The (meth)acrylic acid ester monomer in the present invention is represented by the following general formula (J): $CH_2=C(R^y)CO_2(R^z)$. $R^y$ is a hydrogen atom or a hydrocarbon group having 1 to 10 carbon atoms, which may have a branch, ring, unsaturated bond and the like. $R^z$ is a hydrocarbon group having 1 to 30 carbon atoms, which may have a branch, ring, unsaturated bond and the like. Also, $R^z$ may contain a heteroatom at any position therein.

When the number of the carbon atoms of $R^y$ is 11 or more, polymerization activity tends to be less expressed. Therefore, $R^y$ is a hydrogen atom or a hydrocarbon group having 1 to 10 carbon atoms, and the (meth)acrylic acid ester may be one in which $R^y$ is a hydrogen atom or a hydrocarbon group having 1 to 5 carbon atoms. Also, the (meth)acrylic acid ester monomer may be a methacrylate in which $R^y$ is a methyl group or an acrylate in which $R^y$ is a hydrogen atom. Similarly, when the number of the carbon atoms of $R^z$ is larger than 30, polymerization activity tends to be less expressed. Therefore, the number of the carbon atoms of $R^z$ is from 1 to 30, or it may be from 1 to 12 or may be from 1 to 8.

Also, as the heteroatom optionally contained in $R^z$, examples include, but are not limited to, oxygen, sulfur, selenium, phosphorus, nitrogen, silicon, fluorine and boron. Of them, the heteroatom may be oxygen, silicon, fluorine and the like, or the heteroatom may be oxygen. Also, $R^z$ may be one containing no heteroatom.

Also, the (meth)acrylic acid ester monomer may be methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth) acrylate, nonyl (meth)acrylate, decyl (meth)acrylate, dodecyl (meth)acrylate, phenyl (meth)acrylate, toluoyl (meth)acrylate, benzyl (meth)acrylate, hydroxyethyl (meth) acrylate, dimethylaminoethyl (meth)acrylate, diethylaminoethyl (meth)acrylate, (meth)acrylate-2-aminoethyl, (meth) acrylate-2-methoxyethyl, (meth)acrylate-3-methoxypropyl, glycidyl (meth)acrylate, ethyleneoxide (meth)acrylate, trifluoromethyl (meth)acrylate, 2-trifluoromethylethyl (meth) acrylate, perfluoroethyl (meth)acrylate, (meth)acrylamide, (meth)acryldimethylamide, 2-hydroxybutyl (meth)acrylate, 4-hydroxybutyl (meth)acrylate, and the like. A single (meth) acrylic acid ester may be used, or plural kinds of (meth) acrylic acid esters may be used in combination.

The polymerization reaction in the present invention is carried out in the presence or the absence of a liquid compound which may be: a hydrocarbon solvent such as propane, n-butane, isobutane, n-hexane, n-heptane, toluene, xylene, cyclohexane, and methylcyclohexane; a liquid such as a liquefied α-olefin; a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol and ethylene glycol; or the like.

Also, a mixture of the liquid compounds described here may be used as a solvent.

Furthermore, an ionic liquid can also be used as a solvent.

In the polymerization reaction, the above-described hydrocarbon solvent, ionic liquid and the like may be used from the viewpoint of imparting higher polymerization activity to the catalyst and high molecular weight to the copolymer.

In the present invention, the polymerization reaction can be carried out in the presence or the absence of a known additive.

The additive may be a polymerization inhibitor to inhibit radical polymerization, an additive having an action to stabilize a produced copolymer, and the like.

The additive may be a quinone derivative, a hindered phenol derivative and the like.

Specifically, as the additive, hydroquinone monomethyl ether, 2,6-di-t-butyl-4-methylphenol (BHT), a reaction product of trimethylaluminum and BHT, a reaction product of titanium (IV) alkoxide and BHT, and the like can be used.

Also, at least one of an inorganic filler and an organic filler may be used as the additive, and the polymerization may be carried out in the presence of such fillers. Also, an ionic liquid may be used as the additive.

In the present invention, the additive may be a Lewis base.

Catalyst activity, copolymer's molecular weight and (meth)acrylic acid ester's copolymerization reactivity can be improved by selecting an appropriate Lewis base.

The amount of the Lewis base may be from 0.0001 to 1000 equivalents, may be from 0.1 to 100 equivalents, or may be from 0.3 to 30 equivalents, relative to the transition metal M in the catalyst component present in the polymerization system.

The method for adding the Lewis base to the polymerization system is not particularly limited, and any technique can be used.

For example, the Lewis base may be mixed with the catalyst component of the present invention, may be mixed with the monomer, or may be added to the polymerization system independently from the catalyst component and the monomer. Also, plural kinds of Lewis bases may be used in combination.

As the Lewis base, examples include, but are not limited to, aromatic amines, aliphatic amines, alkyl ethers, aryl ethers, alkyl aryl ethers, cyclic ethers, alkyl nitriles, aryl nitriles, alcohols, amides, aliphatic esters, aromatic esters, phosphates, phosphites, thiophenes, thianthrenes, thiazoles, oxazoles, morpholines and cyclic unsaturated hydrocarbons.

Of them, the Lewis base may be aromatic amines, aliphatic amines, cyclic ethers, aliphatic esters, aromatic esters and the like. Also, the Lewis base may be a pyridine derivative, a pyrimidine derivative, a piperidine derivative, an imidazole derivative, an aniline derivative, a piperidine derivative, a triazine derivative, a pyrrole derivative, a furan derivative and the like.

Specific Lewis base compounds include pyridine, pentafluoropyridine, 2,6-lutidine, 2,4-lutidine, 3,5-lutidine, pyrimidine, N,N-dimethylaminopyridine, N-methylimidazole, 2,2'-bipyridine, aniline, piperidine, 1,3,5-triazine, 2,4,6-tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2.2.2]-octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenylphosphite, triphenylphosphate, tripyrrolizinophosphine, tris(pyrrolizino)borane, and the like.

In the present invention, polymerization style is not particularly limited.

The polymerization style may be slurry polymerization in which at least a part of a produced polymer takes a form of slurry in a medium; bulk polymerization in which a liquefied monomer itself is used as a medium; gas phase polymerization in which polymerization is carried out in a vaporized monomer; high pressure ion polymerization in which at least a part of a produced polymer dissolves in a monomer liquefied at high temperature and high pressure; or the like.

Also, any type of batch polymerization, semi-batch polymerization or continuous polymerization may be used.

Also, living polymerization or a polymerization occurring in conjunction with chain transfer may be carried out.

Also, chain shuttling or coordinative chain transfer polymerization (CCTP) may be carried out by using a so-called chain transfer agent (CSA) in combination.

An unreacted monomer and a medium may be used by separating them from the produced copolymer and recycling them.

In recycling, these unreacted monomer and medium may be reused with or without purification.

For separation of the unreacted monomer and medium from the produced copolymer, a hitherto known method can be used. For example, a method such as filtration, centrifugation, solvent extraction and reprecipitation with poor solvent can be used.

The polymerization temperature, polymerization pressure and polymerization time are not particularly limited. Generally, optimum setting can be done from the following ranges considering productivity and process capacity. That is, the polymerization temperature is generally from −20° C. to 290° C., and it may be from 0° C. to 250° C.; the polymerization pressure may be from 0.1 MPa to 300 MPa, and it may be especially from 0.3 MPa to 250 MPa; and the polymerization time may be from 0.1 minute to 10 hours, may be especially from 0.5 minute to 7 hours, and may be from 1 minute to 6 hours.

In the present invention, polymerization is generally carried out under an inert gas atmosphere. For example, inert gas such as nitrogen, argon and carbon dioxide can be used, and nitrogen may be used. Commingling of a small amount of oxygen or air is allowable.

Supply of the catalyst and monomer to a polymerization reactor is also not particularly limited, and various supplying methods can be employed corresponding to each purpose.

For example, in the case of batch polymerization, such a technique can be employed, that a predetermined amount of monomer is supplied into a polymerization reactor in advance, followed by supplying the catalyst. In this case, an additional monomer or catalyst may be supplied to the polymerization reactor.

In the case of continuous polymerization, such a technique can be employed, that predetermined amounts of monomer and catalyst are supplied to the polymerization reactor continuously or intermittently to carry out polymerization reaction continuously.

As for control of the composition of the copolymer, generally, such a control method can be used, that plural kinds of monomers are supplied to the reactor to vary the ratio of the supplied monomers.

In addition, a method in which the copolymerization composition is controlled by utilizing a difference in monomer reactivity ratios depending on a difference in catalyst structures, and a method in which the copolymerization composition is controlled by utilizing polymerization temperature dependency of the monomer reactivity ratio, are provided.

For controlling the molecular weight of the polymer, a hitherto known method can be used. That is, a method in which the molecular weight is controlled by controlling the polymerization temperature, a method in which the molecular weight is controlled by controlling monomer concentrations, a method in which the molecular weight is controlled by using a chain transfer agent, a method in which the molecular weight is controlled by controlling the ligand structure in the transition metal complex, and the like are provided.

When a chain transfer agent is used, a hitherto known chain transfer agent can be used. For example, hydrogen gas, metalalkyl and the like can be used.

Especially, the copolymer obtained by the present invention expresses superior painting characteristics, printability, antistatic performance, inorganic filler dispersibility, adhesive property to other resins, compatibility with other resins, and the like, by the effect based on the polar group of the copolymer. Utilizing such properties, the copolymer of the present invention can be used for various applications. For example, the copolymer can be used for films, sheets, adhesive resins, binders, compatibilizing agents, waxes, and the like.

EXAMPLES

The present invention is explained in detail in the following Examples and Comparative Examples. However, the present invention is not limited thereto. In the following Synthesis Examples, unless otherwise noted, operations were carried out under a purified nitrogen atmosphere, and dewatered and deoxygenated solvents were used.

1. Evaluation Method (1) Melting Point Tm and Crystallization Temperature Tc:

A melting point Tm and a crystallization temperature Tc were obtained by the following differential scanning calorimetry (DSC).

Using differential scanning calorimeter PYRIS DIAMOND DSC manufactured by Perkin Elmer, a sample (about 5 mg) was melted at 210° C. for 5 minutes. Then, the temperature of the sample was decreased to −20° C. at a rate of 10° C./min, kept at −20° C. for 5 minutes, and then increased to 210° C. at a rate of 10° C./min, thereby obtaining a melting curve.

The peak top temperature of a main exothermic peak in the temperature decrease stage of the melting curve, was determined as crystallization temperature Tc.

In the melting curve, the peak top temperature of a main endothermic peak in the last temperature increase stage carried out to obtain the melting curve, was determined as melting point Tm.

(2) Weight Average Molecular Weight Mw, Number Average Molecular Weight Mn and Molecular Weight Distribution Mw/Mn:

A weight average molecular weight Mw, a number average molecular weight Mn and a molecular weight distribution Mw/Mn were determined by the following gel permeation chromatography (GPC) measurement.

A sample (about 20 mg) was collected in a vial for pretreatment unit PL-SP 260VS for high temperature GPC (manufactured by Polymer Laboratories Ltd.), and o-Dichlorobenzene containing BHT as a stabilizer (concentration of BHT=0.5 g/L) was added to the vial to produce a sample solution. The polymer concentration of the sample solution was adjusted to 0.1 (% by mass).

The sample was prepared by heating a polymer at 135° C. in the above-described pretreatment unit PL-SP 260VS for high temperature GPC and filtering the resulting product with a glass filter.

No polymer was seized by the glass filter in GPC measurement of the present invention.

Next, GPC measurement was carried out using HLC-8321GPC/HT (manufactured by Tosoh Corporation) equipped with TSKGEL GMH-HT columns (30 cm×4 pieces) manufactured by Tosoh Corporation and an RI detector.

The following measuring conditions were employed:

Injected sample solution amount: About 300 μl

Column temperature: 135° C.

Solvent: o-Dichlorobenzene

Flow rate: 1.0 mL/min

Calculation of the molecular weight of the sample was carried out as follows.

That is, commercially available monodisperse polystyrene was used as a standard sample; a calibration curve on retention time versus molecular weight was prepared from the viscosity formulae of the polystyrene standard sample and an ethylene polymer; and calculation of the molecular weight of the sample was carried out based on the calibration curve.

As a viscosity formula, $[\eta]=K \times M^a$ was used. For polystyrene, $K=1.38 \times 10^{-4}$ and $a=0.70$ were used. For ethylene polymer, $K=4.77 \times 10^{-4}$ and $a=0.70$ were used.

2. Ligands and Complexes (Synthesis Example 1): Synthesis of Ligand B-423

Ligand B-423 was synthesized according to the following scheme 1.

In chemical formulae mentioned below, —OMOM represents methoxymethoxy group (—OCH$_2$OCH$_3$), and iPr represents isopropyl group.

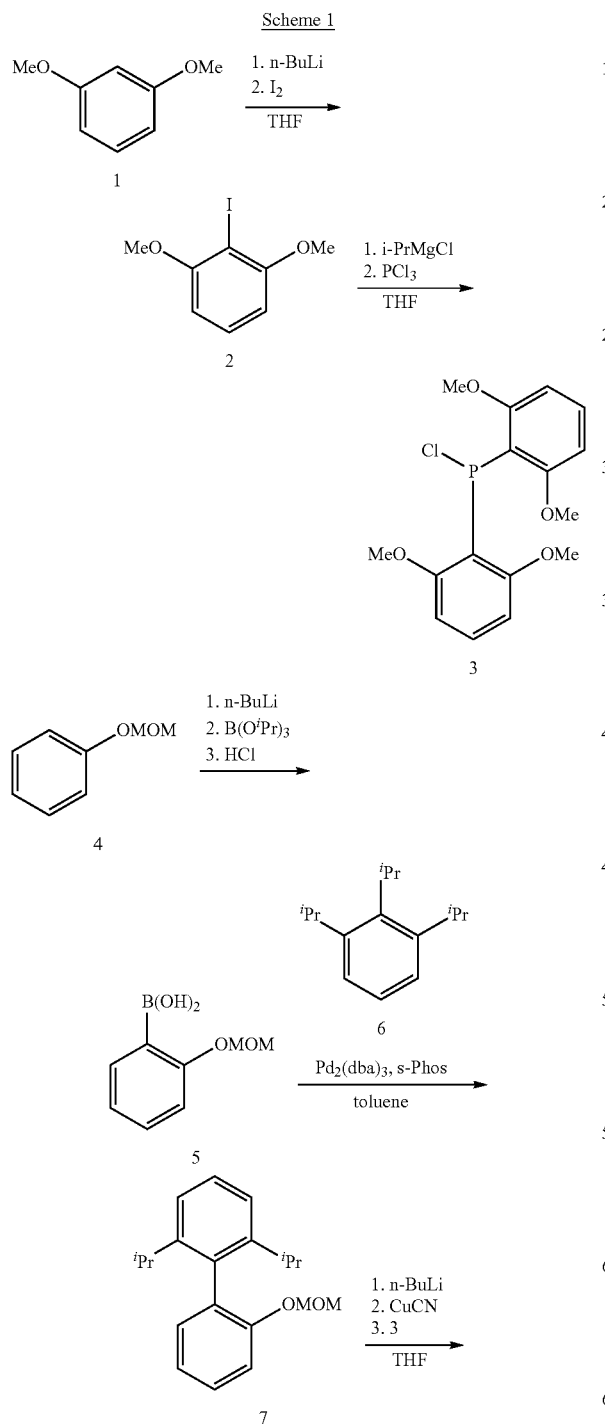

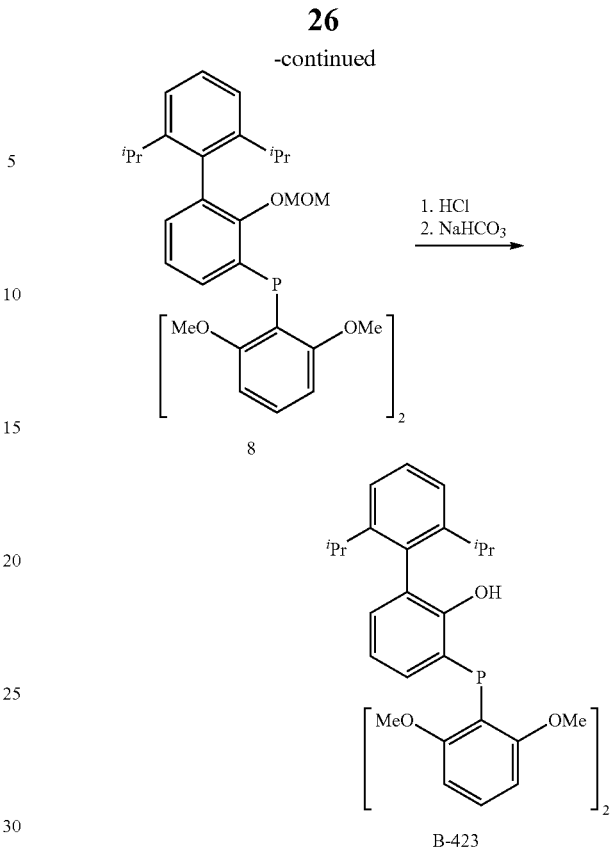

(i) Synthesis of Compound 2

To an anhydrous THF (500 ml) solution of 2,6-dimethoxybenzene (compound 1, 50 g, 0.36 mol), an n-hexane solution (166 ml, 0.42 mol) of n-butyllithium was gradually added at 0° C. under a nitrogen atmosphere. An anhydrous THF (200 ml) solution of iodine (96.5 g, 0.38 mol) was added dropwise thereto at 0° C. for 40 minutes. A solution thus obtained was stirred all night at room temperature. Then, methanol (80 ml) was added dropwise thereto. A mixture thus obtained was concentrated under reduced pressure. After water (200 ml) was added to a concentration residual, the residual was extracted three times with ethyl acetate (250 ml). An organic layer was collected from the mixture, washed with Na$_2$S$_2$O$_3$ and brine, and then dried using sodium sulfate. After the drying, the organic layer was filtered to separate inorganic salt. The organic layer was concentrated under reduced pressure, and a residue thus obtained was washed four times with methanol (50 ml) and dried. Accordingly, a compound 2 represented by the scheme 1 was obtained, which was in the form of a yellow solid. Yield: 63 g (yield: 66%).

(ii) Synthesis of Compound 3

To a THF (5.0 ml) solution of the compound 2 (2.64 g, 10.0 mmol) represented by the scheme 1, iso-PrMgCl (2 M, 5.25 ml) was added at 0° C. A reaction mixture thus obtained was stirred at 25° C. for 1 hour. Then, to the reaction mixture, PCl$_3$ (618 mg, 4.50 mmol) was added at −78° C.

The temperature of the reaction mixture was increased to 25° C. for 3 hours, thereby obtaining a yellow suspension. The solvent of the suspension was removed by distillation under reduced pressure, thereby obtaining a compound 3 in the form of a yellow solid. The compound 3 was used in the next reaction, without purification.

(iii) Synthesis of Compound 5

To a THF (250 ml) solution of a compound 4 (30 g, 220 mmol) represented by the scheme 1, n-BuLi (2.5 M, 96 ml) was added at 0° C. A solution thus obtained was stirred at 30° C. for 1 hour. To the solution, B(O$^i$Pr)$_3$ (123 g, 651 mmol) was added at −78° C., and a reaction mixture was stirred at 30° C. for 2 hours, thereby obtaining a white suspension.

Hydrochloric acid (1 M) was added to the suspension to adjust the pH to 6 to 7 (pH=6 to 7). A reaction solution thus obtained was concentrated to obtain a mixture.

The obtained mixture was washed with petroleum ether (80 ml), thereby obtaining a compound 5 (26 g) represented by the scheme 1.

(iv) Synthesis of Compound 7

The compound 5 (5.00 g, 27.5 mmol) represented by the scheme 1, a compound 6 (4.42 g, 18.3 mmol), Pd$_2$(dba)$_3$ (168 mg, 0.183 mmol), s-Phos (2-dicyclohexylphosphino-2',6'-dimethoxybiphenyl) (376 mg, 0.916 mmol) and K$_3$PO$_4$ (7.35 g, 34.6 mmol) were put in a flask. Toluene (40 ml) was added thereto. A reaction solution thus obtained was reacted at 110° C. for 12 hours, thereby obtaining a black suspension.

H$_2$O (50 ml) was added to the suspension. The suspension was extracted three times with EtOAc (55 ml), and an organic layer was collected.

The organic layer was washed with brine (20 ml) and dehydrated with Na$_2$SO$_4$.

The organic layer was filtered for removal of the solvent from the organic layer by distillation under reduced pressure. Then, a concentration residual was purified with a silica gel column, thereby obtaining an oily substance (1.3 g) as a compound 7 represented by the scheme 1.

(v) Synthesis of Compound 8

To a THF (40 ml) solution of the compound 7 (6.5 g, 22 mmol) represented by the scheme 1, n-BuLi (2.5 M, 9.15 ml) was added dropwise at 0° C. The temperature of a solution thus obtained was increased to 30° C. and stirred for 1 hour. A reaction solution thus obtained was cooled to −78° C., and CuCN (2.1 g, 23 mmol) was added thereto. The solution was stirred at 30° C. for 1 hour.

Then, the reaction solution was cooled to −78° C., and a THF (40 ml) solution of the compound 3 (6.7 g, 20 mmol) represented by the scheme 1 was added thereto. The solution was stirred at 30° C. for 12 hours, thereby obtaining a white suspension.

H$_2$O (50 ml) was added to the suspension. As a result, a white precipitate was produced.

The white precipitate was collected by filtration and dissolved in dichloromethane (20 ml). Ammonia water (80 ml) was added thereto to produce a mixed solution, and the mixed solution was stirred for 3 hours.

A product thus obtained was extracted three times with dichloromethane (50 ml), dehydrated with Na$_2$SO$_4$ and then concentrated, thereby obtaining a yellow oily substance. The oily substance was purified with a silica gel column, thereby obtaining a compound 8 (2.9 g) represented by the scheme 1.

(vi) Synthesis of B-423

To a dichloromethane (20 ml) solution of the compound 8 (2.9 g, 4.8 mmol) represented by the scheme 1, HCl/EtOAc (4 M, 50 ml) was added at 0° C. A solution thus obtained was stirred at 30° C. for 2 hours, thereby obtaining a light yellow solution. The solvent of the solution was removed by distillation under reduced pressure. To a concentration residual, dichloromethane (50 ml) was added. The residual was washed with a saturated NaHCO$_3$ aqueous solution (100 ml), thereby obtaining a ligand B-423 (2.5 g).

The NMR assigned value of the obtained ligand B-423 is shown below.

[NMR]

$^1$H NMR (CDCl$_3$, δ, ppm): 7.49 (t, 1H), 7.33 (t, 1H), 7.22 (m, 4H), 6.93 (d, 1H), 6.81 (t, 1H), 6.49 (dd, 4H), 6.46 (br, 1H), 3.56 (s, 12H), 2.63 (sept, 2H), 1.05 (d, 6H), 1.04 (d, 6H);

$^{31}$P NMR (CDCl$_3$, δ, ppm): −61.6 (s).

(Synthesis Example 2): Synthesis of Ligand B-443

A ligand B-443 was synthesized according to the following scheme 2.

Scheme 2

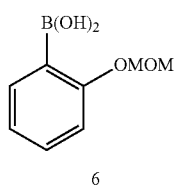

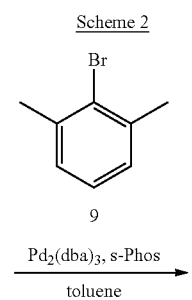

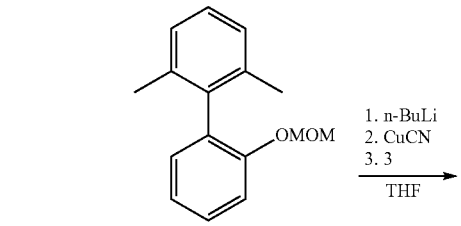

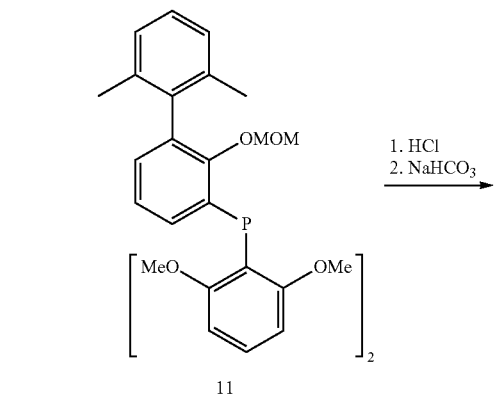

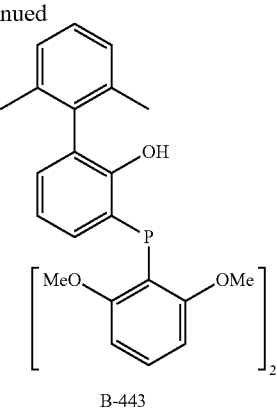

B-443

(i) Synthesis of Compound 10

The compound 5 (11.8 g, 64.8 mmol) represented by the scheme 2, a compound 9 (8.0 g, 43 mmol), Pd(dba)$_2$ (249 mg, 0.432 mmol), s-Phos (2-dicyclohexylphosphino-2',6'-dimethoxybiphenyl) (887 mg, 2.16 mmol) and K$_3$PO$_4$ (17.3 g, 81.7 mmol) were put in a reaction container, and toluene (80 ml) was added thereto (dba means dibenzylideneacetone).

A mixture thus obtained was reacted at 110° C. for 24 hours, thereby obtaining a black suspension.

The suspension was cooled to 30° C., and H$_2$O (250 ml) was added thereto. Then, the suspension was extracted three times with dichloromethane (250 ml).

An organic layer was dried with Na$_2$SO$_4$. Then, a solvent was removed by distillation under reduced pressure.

A residual thus obtained was purified with a silica gel column, and an oily substance thus obtained was dried under reduced pressure at 80° C. for 1 hour, thereby obtaining a compound 10 (6.6 g) represented by the scheme 2, which was in the form of a yellow oily substance.

(ii) Synthesis of Compound 11

To a THF (40 ml) solution of the compound 10 (10 g, 41 mmol) represented by the scheme 2, n-BuLi (2.5 M, 18.2 ml) was added at 0° C. The temperature of the solution was increased to 30° C. Then, the solution was stirred for 1 hour.

To a suspension thus obtained, CuCl (4.49 g, 45.4 mmol) was added at 0° C. The temperature of the suspension was increased to 30° C. Then, the suspension was stirred for 1 hour.

To the suspension, a THF (80 ml) solution of the compound 3 (13.9 g, 40.9 mmol) was slowly added dropwise at −78° C. The mixture was stirred at 66° C. for 16 hours, thereby obtaining a yellow suspension.

The suspension was filtered to concentrate a filtrate. To a concentration residual, dichloromethane (150 ml) and ammonia water (50 ml) were added, and the mixture was stirred at 30° C. for 2 hours.

A solution thus obtained was extracted three times with dichloromethane (50 ml). An organic layer thus obtained was dried with Na$_2$SO$_4$, filtered and concentrated, thereby obtaining a crude product.

The crude product was purified by a silica gel column (as a developing solvent, petroleum ether:EtOAc:dichloromethane=1:0:0-20:1:1-10:1:1). To a purified product, a mixed solution (150 ml) of petroleum ether:EtOAc=5:1 was added. A mixed solution was concentrated to 40 ml, and a precipitate was collected by filtration, thereby obtaining a compound 11 represented by the scheme 2, which was in the form of a white solid.

(iii) Synthesis of B-443

To a dichloromethane (50 ml) solution of the compound 11 (5.0 g, 9.2 mmol) represented by the scheme 2, HCl/EtOAc (4 M, 83 ml) was added. The solution was stirred at 30° C. for 2.5 hours.

Then, the solution was concentrated. A deaerated NaHCO$_3$ aqueous solution (60 ml) was added to a concentration residual to adjust the pH to 6.5 to 7.0.

A product thus obtained was extracted three times with dichloromethane (60 ml). From a solution containing the product, a solvent was removed by distillation under reduced pressure, thereby obtaining B-443 (4.5 g) in the form of a white solid.

The NMR assigned value of the obtained ligand B-443 is shown below.

[NMR]

$^1$H NMR (CDCl$_3$, δ, ppm): 7.46 (br, 1H), 7.25-7.05 (br, 5H), 6.92 (br, 1H), 6.84 (br, 1H), 6.50 (br, 4H), 3.57 (s, 12H), 2.02 (s, 6H);

$^{31}$P NMR (CDCl$_3$, δ, ppm): −61.6(s).

(Synthesis Example 3): Synthesis of Ligand B-14

A ligand B-14 was synthesized according to the synthesis example 1 described in Japanese Patent Application Laid-Open (JP-A) No. 2010-260913.

The structural formula of the ligand B-14 is shown below.

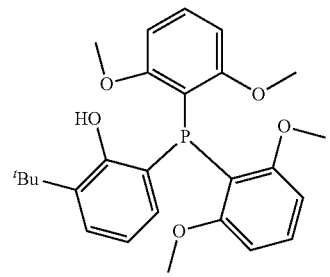

B-14

(Synthesis Example 4): Synthesis of Ligand B-30

A ligand B-30 was synthesized according to the synthesis example 5 described in JP-A No. 2010-260913.

The structural formula of the ligand B-30 is shown below.

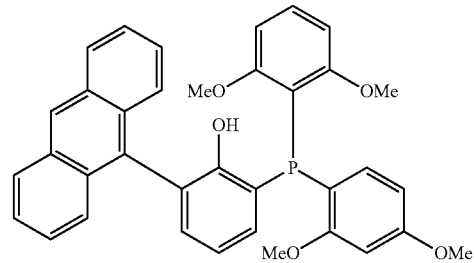

B-30

(Synthesis Example 5): Synthesis of Ligand B-56DM

A ligand B-56DM was synthesized according to the synthesis example 6 described in JP-A No. 2010-260913.

The structural formula of the ligand B-56DM is shown below.

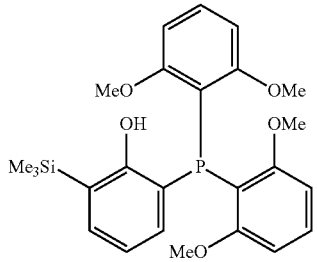

B-56DM (Synthesis Example 6): Synthesis of Ligand B-27DM

A ligand B-27DM was synthesized according to the synthesis example 4 described in International Publication No. WO2010/050256.

The structural formula of the ligand B-27DM is shown below.

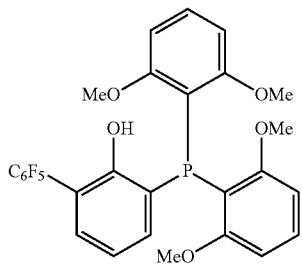

B-27DM (Synthesis Example 7): Synthesis of Ligand B-125

A ligand B-125 was synthesized according to the synthesis example 7 described in JP-A No. 2013-209350.

The structural formula of the ligand B-125 is shown below.

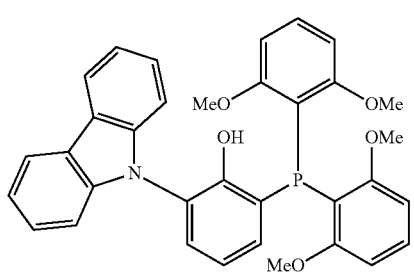

B-125

3. Copolymerization

Example 1

Copolymerization of Ethylene and t-Butyl Acrylate Using Ligand B-423:

(i) Synthesis of B-423/Ni(Acac)$_2$ Complex

The following operation was all carried out under a nitrogen atmosphere.

Hereinafter, nickel acetylacetone will be referred to as Ni(acac)$_2$.

Ni(acac)$_2$ (90.0 mg, 0.35 mmol) was dissolved in toluene (30 mL) to obtain a solution 1. The solution 1 was added to B-423 (200 mg, 0.36 mmol) obtained in Synthesis Example 1 as a ligand, thereby obtaining a reaction solution.

The reaction solution was stirred for 10 minutes at room temperature. Then, a solvent was removed from the reaction solution by distillation under reduced pressure, thereby obtaining a deep red purple solid.

The deep red purple solid was washed twice with hexane (10 mL) and then dried under reduced pressure, thereby obtaining a red purple solid reaction product (a metal complex 1) (yield 247 g, yield 99%).

The NMR assigned value of the obtained metal complex 1 is shown below.

[NMR]

$^1$HNMR (C$_6$D$_6$, δ, ppm): 7.65 (d, 1H), 7.25-7.35 (m, 3H), 7.07 (t, 2H), 6.97 (d, 1H), 6.51 (t, 1H), 6.26 (d, 4H), 4.83 (brs, 1H), 3.44 (s, 12H), 3.14 (sept, 2H), 1.44 (d, 6H), 1.29 (s, 6H), 1.21 (d, 6H) (ii) Copolymerization of ethylene and t-butyl acrylate Dry toluene (1 L), t-butyl acrylate (23.0 ml, 158 mmol) and tri-n-octylaluminum (0.1 mmol) were introduced into an induction-stirring autoclave having an inner volume of about 2 L to obtain a mixture.

The temperature of the autoclave was increased to 110° C. with stirring the mixture. Then, an ethylene was supplied to the autoclave to adjust ethylene partial pressure inside the autoclave to 3.0 MPa.

After the adjustment, the reaction product (the metal complex 1: 20 μmol) obtained in the above (i) was supplied to the autoclave to initiate the copolymerization of the ethylene and the t-butyl acrylate.

After the ethylene and the t-butyl acrylate were copolymerized for 1 hour, 1,2-butanediol was introduced into the autoclave to suspend the polymerization reaction.

After unreacted gas was removed from the autoclave, the autoclave was opened. Ethanol was added to the autoclave to precipitate a copolymer, thereby obtaining a precipitate. The precipitate was filtered, washed and then heat-dried, thereby obtaining the copolymer of the ethylene and the t-butyl acrylate.

The polymerization result is shown in Table 4.

In Table 4, tBA means t-butyl acrylate.

Activity ($C_E$) means the copolymer yield (g) per mol of the metal complex 1 used for polymerization and per polymerization hour. The GPC and DSC measurement results of the obtained copolymer are also shown in Table 4.

Example 2

Copolymerization of Ethylene and t-Butyl Acrylate Using Ligand B-423:

(i) Formation of B-423/Ni(Acac)$_2$ Complex

As the ligand, the ligand B-423 (33.1 mg, 0.060 mmol) obtained in Synthesis Example 1 was weighed out in a 50 mL two-necked recovery flask under the air atmosphere. The inside of the flask was replaced by nitrogen.

In a glove box, Ni(acac)$_2$ (28.2 mg, 0.110 mmol) was weighed out in another two-necked recovery flask. Under a nitrogen atmosphere, toluene (11.0 mL) was added thereto to obtain a 0.01 mol/L solution 1.

The 0.01 mol/L toluene solution (6.0 mL) of the Ni(acac)$_2$ was added to the 50 mL two-necked recovery flask containing the ligand B-423 under a nitrogen atmosphere to obtain a solution 2. The solution 2 was stirred at room temperature for one minute, thereby obtaining a reaction solution containing a metal complex 2.

The color of the reaction solution changed to red-purple.

(ii) Copolymerization of Ethylene and t-Butyl Acrylate

Copolymerization was carried out in the same manner as Example 1, except that the metal complex 2 obtained in the above (i) was used as the metal complex. The result is shown in Table 4.

The activity was calculated on the basis that the ligand B-423 and the Ni(acac)$_2$ reacted at a molar ratio of 1:1 to form a nickel complex.

Example 3

Copolymerization of Ethylene and t-Butyl Acrylate Using Ligand B-423:

(i) Formation of B-423/Ni(Acac)$_2$ Complex

As the ligand, the ligand B-423 (38.4 mg, 0.069 mmol) obtained in Synthesis Example 1 was weighed out in a 50 mL two-necked recovery flask under the air atmosphere.

In a glove box, Ni(acac)$_2$ (23.7 mg, 0.092 mmol) was weighed out in another two-necked recovery flask. Under the air atmosphere, toluene (6.9 mL) was added thereto to obtain a 0.01 mol/L solution 1.

The 0.01 mol/L toluene solution (6.0 mL) of the Ni(acac)$_2$ was added to the 50 mL two-necked recovery flask containing the ligand B-423 under the air atmosphere to obtain a solution 2. The solution 2 was stirred at room temperature for 30 minutes, thereby obtaining a reaction solution containing a metal complex 3.

The color of the reaction solution changed to red-purple.

(ii) Copolymerization of Ethylene and t-Butyl Acrylate

Copolymerization was carried out in the same manner as Example 1, except that 40 μmol of the metal complex 3 obtained in the above (i) was used as the metal complex. The result is shown in Table 4.

The activity was calculated on the basis that the ligand B-423 and the Ni(acac)$_2$ reacted at a molar ratio of 1:1 to form a nickel complex.

Example 4

Copolymerization of Ethylene and t-Butyl Acrylate Using Ligand B-443:

(i) Formation of B-443/Ni(Acac)$_2$ Complex

A metal complex 4 was formed in the same manner as Example 2, except the following: the ligand B-443 (30.1 mg, 0.060 mmol) obtained in Synthesis Example 2 was used as the ligand; a toluene solution (0.01 mol/L) of Ni(acac)$_2$ was prepared; and the toluene solution of the Ni(acac)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that the metal complex 4 obtained in the above (i) was used as the metal complex. The result is shown in Table 4.

The activity was calculated on the basis that the ligand B-443 and the Ni(acac)$_2$ reacted at a molar ratio of 1:1 to form a nickel complex.

Comparative Example 1

Copolymerization of Ethylene and t-Butyl Acrylate Using Ligand 423/Ni(Cod)$_2$:

(i) Formation of B-423/Ni(Cod)$_2$ Complex

The following operation was all carried out under a nitrogen atmosphere. Hereinafter, bis-1,5-cyclooctadienenickel(0) will be referred to as Ni(cod)$_2$.

Ni(cod)$_2$ (53.8 mg, 0.196 mmol) was weighed out in a two-necked recovery flask. Toluene (19.6 ml) was added thereto to obtain a 0.01 mol/L solution.

The 0.01 mol/L toluene solution (8.0 ml) of the Ni(cod)$_2$ was added to the two-necked recovery flask containing the ligand B-423 (44.9 mg, 0.0804 mmol) obtained in Synthesis Example 1. The mixture was stirred at 40° C. for 30 minutes, thereby obtaining a reaction solution containing a metal complex A.

The color of the reaction solution changed from yellow to orange.

(ii) Copolymerization of Ethylene and t-Butyl Acrylate

Copolymerization was carried out in the same manner as Example 1, except that the reaction solution (2.0 ml) containing the metal complex A obtained in the above (i) was used. The result is shown in Table 4.

The activity was calculated on the basis that the ligand B-423 and the Ni(cod)$_2$ reacted at a molar ratio of 1:1 to form a nickel complex.

Comparative Example 2

Copolymerization of Ethylene and t-Butyl Acrylate Using Ligand B-443:

(i) Formation of B-443/Ni(Cod)$_2$ Complex

A metal complex B was formed in the same manner as Comparative Example 1, except the following: the ligand B-443 (69.6 mg, 0.253 mmol) obtained in Synthesis Example 2 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (8.0 ml) containing the metal complex B obtained in the above (i) was used. The result is shown in Table 4.

The activity was calculated on the basis that the ligand B-443 and the Ni(cod)$_2$ reacted at a molar ratio of 1:1 to form a nickel complex.

Comparative Example 3

As the ligand, the ligand B-423 (25.1 mg, 0.044 mmol) obtained in Synthesis Example 1 was weighed out in a 50 mL two-necked recovery flask under the air atmosphere.

In a glove box, Ni(cod)$_2$ (27.0 mg, 0.098 mmol) was weighed out in another two-necked recovery flask. Under the air atmosphere, toluene (9.8 mL) was added thereto to obtain a 0.01 mol/L solution. At that time, part of the Ni(cod)$_2$ was decomposed, and a nickel(0) component was produced in the form of a black precipitate.

The 0.01 mol/L toluene solution (4.4 ml) of the Ni(cod)$_2$ was added to the flask containing the ligand B-423 under the air atmosphere to initiate a reaction. As a result, a precipitate was produced, and decomposition of the complex was observed. Accordingly, polymerization evaluation was not carried out.

TABLE 4

| | Ligand | Transition metal compound | Complex preparation atmosphere | Catalyst amount (μmol) | Activity $C_E$ (g/mol) | tBA (mol %) | Mw | Mw/Mn | Tm (° C.) | Tc (° C.) |
|---|---|---|---|---|---|---|---|---|---|---|
| Example 1 | B-423 | Ni(acac)$_2$ | Nitrogen | 20 | 5.3 × 10$^5$ | 7.3 | 36,000 | 1.8 | 84.4 | 70.4 |
| Example 2 | B-423 | Ni(acac)$_2$ | Nitrogen | 20 | 6.3 × 10$^5$ | 6.4 | 39,000 | 1.7 | 88.4 | 73.9 |
| Example 3 | B-423 | Ni(acac)$_2$ | Air | 40 | 5.2 × 10$^5$ | 6.2 | 39,000 | 1.8 | 90.4 | 76.0 |
| Example 4 | B-443 | Ni(acac)$_2$ | Nitrogen | 20 | 3.1 × 10$^5$ | 6.4 | 32,000 | 1.7 | 89.8 | 76.2 |
| Comparative Example 1 | B-423 | Ni(cod)$_2$ | Nitrogen | 20 | 3.9 × 10$^5$ | 6.7 | 36,000 | 1.9 | 87.2 | 72.2 |
| Comparative Example 2 | B-443 | Ni(cod)$_2$ | Nitrogen | 80 | 2.1 × 10$^5$ | 5.8 | 32,000 | 1.9 | 91.6 | 75.6 |

Example 5

Copolymerization of Ethylene and t-Butyl Acrylate Using Ligand B-14:
(i) Formation of B-14/Ni(Acac)$_2$ Complex A reaction solution containing a metal complex 5 was obtained in the same manner as Example 2, except the following: the ligand B-14 (30.0 mg, 0.066 mmol) obtained in Synthesis Example 3 was used as the ligand; a toluene solution (0.01 mol/L) of Ni(acac)$_2$ was prepared; and the toluene solution of the Ni(acac)$_2$ was added to the ligand B-14 so that the Ni and the ligand B-14 were at a molar ratio of 1:1.
(ii) Copolymerization of Ethylene and t-Butyl Acrylate Copolymerization was carried out in the same manner as Example 1, except that the reaction solution (2.0 ml) containing the metal complex 5 obtained in the above (i) was used as the metal complex. The result is shown in Table 5.

The activity was calculated on the basis that the ligand B-14 and the Ni(acac)$_2$ reacted at a molar ratio of 1:1 to form a nickel complex.

Example 6

Copolymerization of Ethylene and t-Butyl Acrylate Using Ligand B-30:
(i) Formation of B-30/Ni(Acac)$_2$ Complex A reaction solution containing a metal complex 6 was obtained in the same manner as Example 2, except the following: the B-30 (34.1 mg, 0.059 mmol) obtained in Synthesis Example 4 was used as the ligand; a toluene solution (0.01 mol/L) of Ni(acac)$_2$ was prepared; and the toluene solution of the Ni(acac)$_2$ was added to the ligand B-30 so that the Ni and the ligand B-30 were at a molar ratio of 1:1.
(ii) Copolymerization of Ethylene and t-Butyl Acrylate Copolymerization was carried out in the same manner as Example 1, except that the reaction solution (2.0 ml) containing the metal complex 6 obtained in the above (i) was used as the metal complex. The result is shown in Table 5.

The activity was calculated on the basis that the ligand B-30 and the Ni(acac)$_2$ reacted at a molar ratio of 1:1 to form a nickel complex.

Example 7

Copolymerization of Ethylene and t-Butyl Acrylate Using Ligand B-56DM:
(i) Formation of B-56DM/Ni(Acac)$_2$ Complex A reaction solution containing a metal complex 7 was obtained in the same manner as Example 2, except the following: the ligand B-56DM (47.3 mg, 0.101 mmol) obtained in Synthesis Example 5 was used as the ligand; a toluene solution (0.01 mol/L) of Ni(acac)$_2$ was prepared; and the toluene solution of the Ni(acac)$_2$ was added to the ligand B-56DM B 30 so that the Ni and the ligand B-56DM B 30 were at a molar ratio of 1:1.
(ii) Copolymerization of Ethylene and t-Butyl Acrylate Copolymerization was carried out in the same manner as Example 1, except that the reaction solution (2.0 ml) containing the metal complex 7 obtained in the above (i) was used as the metal complex. The result is shown in Table 5.

The activity was calculated on the basis that the ligand B-56DM and the Ni(acac)$_2$ reacted at a molar ratio of 1:1 to form a nickel complex.

Example 8

Copolymerization of Ethylene and t-Butyl Acrylate Using Ligand B-27DM:
(i) Formation of B-27DM/Ni(Acac)$_2$ Complex A reaction solution containing a metal complex 8 was obtained in the same manner as Example 2, except the following: the ligand B-27DM (43.6 mg, 0.077 mmol) obtained in Synthesis Example 6 was used as the ligand; a toluene solution (0.01 mol/L) of Ni(acac)$_2$ was prepared; and the toluene solution of the Ni(acac)$_2$ was added to the ligand B-27DM so that the Ni and the ligand B-27DM were at a molar ratio of 1:1.
(ii) Copolymerization of Ethylene and t-Butyl Acrylate Copolymerization was carried out in the same manner as Example 1, except that the reaction solution (2.0 ml) containing the metal complex 8 obtained in the above (i) was used as the metal complex. The result is shown in Table 5.

The activity was calculated on the basis that the ligand B-27DM and the Ni(acac)$_2$ reacted at a molar ratio of 1:1 to form a nickel complex.

Example 9

Copolymerization of Ethylene and t-Butyl Acrylate Using Ligand B-125:
(i) Formation of B-125/Ni(Acac)$_2$ Complex A reaction solution containing a metal complex 9 was obtained in the same manner as Example 2, except the following: the B-125 (29.9 mg, 0.053 mmol) obtained in Synthesis Example 7 was used as the ligand; a toluene solution (0.01 mol/L) of Ni(acac)$_2$ was prepared; and the toluene solution of the Ni(acac)$_2$ was added to the ligand B-125 so that the Ni and the ligand B-125 were at a molar ratio of 1:1.
(ii) Copolymerization of Ethylene and t-Butyl Acrylate Copolymerization was carried out in the same manner as Example 1, except that the reaction solution (2.0 ml) containing the metal complex 9 obtained in the above (i) was used as the metal complex. The result is shown in Table 5.

Comparative Example 4

Copolymerization of Ethylene and t-Butyl Acrylate Using Ligand B-14:
(i) Formation of B-14/Ni(Cod)$_2$ Complex A metal complex C was formed in the same manner as Comparative Example 1, except the following: the ligand B-14 (92.4 mg, 0.203 mmol) obtained in Synthesis Example 3 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (4.0 ml) containing the metal complex C obtained in the above (i) was used. The result is shown in Table 5.

The activity was calculated on the basis that the ligand B-14 and the Ni(cod)$_2$ reacted at a molar ratio of 1:1 to form a nickel complex.

Comparative Example 5

Copolymerization of Ethylene and t-Butyl Acrylate Using Ligand B-30:
(i) Formation of B-30/Ni(Cod)$_2$ Complex A metal complex D was formed in the same manner as Comparative Example 1, except the following: the ligand B-30 (72.2 mg, 0.126 mmol) obtained in Synthesis Example 4 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (4.0 ml) containing the metal complex D obtained in the above (i) was used. The result is shown in Table 5.

The activity was calculated on the basis that the ligand B-30 and the Ni(cod)$_2$ reacted at a molar ratio of 1:1 to form a nickel complex.

Comparative Example 6

Copolymerization of Ethylene and t-Butyl Acrylate Using Ligand B-56DM:
(i) Formation of B-56DM/Ni(Cod)$_2$ Complex A metal complex E was formed in the same manner as Comparative Example 1, except that the ligand B-56DM (109.3 mg, 0.232 mmol) obtained in Synthesis Example 5 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (4.0 ml) containing the metal complex E obtained in the above (i) was used. The result is shown in Table 5.

The activity was calculated on the basis that the ligand B-56DM and the Ni(cod)$_2$ reacted at a molar ratio of 1:1 to form a nickel complex.

Comparative Example 7

Copolymerization of Ethylene and t-Butyl Acrylate Using Ligand B-27DM:
(i) Formation of B-27DM/Ni(Cod)$_2$ Complex A metal complex F was formed in the same manner as Comparative Example 1, except the following: the ligand B-27DM (137.1 mg, 0.243 mmol) obtained in Synthesis Example 6 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (4.0 ml) containing the metal complex F obtained in the above (i) was used. The result is shown in Table 5.

The activity was calculated on the basis that the ligand B-27DM and the Ni(cod)$_2$ reacted at a molar ratio of 1:1 to form a nickel complex.

Comparative Example 8

Copolymerization of Ethylene and t-Butyl Acrylate Using Ligand B-125:
(i) Formation of B-125/Ni(Cod)$_2$ Complex A metal complex G was formed in the same manner as Comparative Example 1, except the following: the ligand B-125 (66.5 mg, 0.118 mmol) obtained in Synthesis Example 7 was used as the ligand; a toluene solution (0.01 mol/L) of Ni(cod)$_2$ was prepared; and the toluene solution of the Ni(cod)$_2$ was added to the ligand so that the Ni and the ligand were at a molar ratio of 1:1.

(ii) Copolymerization of Ethylene and t-Butyl Acrylate

Copolymerization was carried out in the same manner as Example 1, except that a reaction solution (4.0 ml) containing the metal complex G obtained in the above (i) was used. The result is shown in Table 5.

The activity was calculated on the basis that the ligand B-125 and the Ni(cod)$_2$ reacted at a molar ratio of 1:1 to form a nickel complex.

For the olefin polymerization catalyst containing the complex using the Ni(acac)$_2$ of Example 5 and the olefin polymerization catalyst containing the complex using the Ni(cod)$_2$ of Comparative Example 4, the activity of the olefin polymerization catalyst of Example 5 with respect to the olefin polymerization catalyst of Comparative Example 4 when the activity of the olefin polymerization catalyst of Comparative Example 4 was determined as 100%, was compared. The result is shown in Table 5.

In the same manner as above, the activity of the olefin polymerization catalyst of Example 6 with respect to Comparative Example 5, the activity of the olefin polymerization catalyst of Example 7 with respect to Comparative Example 6, the activity of the olefin polymerization catalyst of Example 8 with respect to Comparative Example 7, and the activity of the olefin polymerization catalyst of Example 9 with respect to Comparative Example 8, were compared. The results are shown in Table 5.

TABLE 5

| | Ligand | Transition metal compound | Complex preparation atmosphere | Catalyst amount (μmol) | Activity $C_E$ (g/mol) | tBA (mol %) | Mw | Mw / Mn | Tm (° C.) | Tc (° C.) | Activity comparison (%) to Ni(cod)$_2$ |
|---|---|---|---|---|---|---|---|---|---|---|---|
| Example 5 | B-14 | Ni(acac)$_2$ | Nitrogen | 20 | $4.4 \times 10^5$ | 5.6 | 33,000 | 1.8 | 93.4 | 77.7 | 220 |
| Example 6 | B-30 | Ni(acac)$_2$ | Nitrogen | 20 | $6.4 \times 10^5$ | 7.3 | 24,000 | 1.8 | 89.2 | 76.3 | 228 |
| Example 7 | B-56DM | Ni(acac)$_2$ | Nitrogen | 20 | $5.8 \times 10^5$ | 5.2 | 26,000 | 1.9 | 96.6 | 83.2 | 232 |
| Example 8 | B-27DM | Ni(acac)$_2$ | Nitrogen | 20 | $5.7 \times 10^5$ | 5.1 | 27,000 | 1.9 | 94.5 | 79.2 | 112 |
| Example 9 | B-125 | Ni(acac)$_2$ | Nitrogen | 20 | $1.0 \times 10^6$ | 5.1 | 28,000 | 1.9 | 97.1 | 83.6 | 238 |
| Comparative Example 4 | B-14 | Ni(cod)$_2$ | Nitrogen | 40 | $2.0 \times 10^5$ | 5.5 | 31,000 | 1.9 | 92.4 | 77.7 | — |
| Comparative Example 5 | B-30 | Ni(cod)$_2$ | Nitrogen | 40 | $2.8 \times 10^5$ | 7.1 | 24,000 | 1.9 | 88.6 | 79.1 | — |
| Comparative Example 6 | B-56DM | Ni(cod)$_2$ | Nitrogen | 40 | $2.5 \times 10^5$ | 5 | 24,000 | 2.0 | 95.9 | 83.0 | — |
| Comparative Example 7 | B-27DM | Ni(cod)$_2$ | Nitrogen | 40 | $5.1 \times 10^5$ | 5.1 | 27,000 | 1.9 | 95.9 | 81.3 | — |
| Comparative Example 8 | B-125 | Ni(cod)$_2$ | Nitrogen | 40 | $4.2 \times 10^5$ | 5.7 | 24,000 | 1.8 | 93.6 | 81.4 | — |

4. Consideration

As is clear from Comparative Example 1 in Table 4, for the ethylene and t-butyl acrylate copolymerization using the olefin polymerization catalyst in which the metal complex using the ligand B-423 as the ligand and the Ni(cod)$_2$ as the transition metal compound was contained, the polymerization activity is $3.9 \times 10^5$ (g/mol) and low.

As is clear from Examples 1 and 2 in Table 4, for the ethylene and t-butyl acrylate copolymerization using the olefin polymerization catalyst in which the metal complex (Examples 1 and 2) using the ligand B-423 as the ligand of the present invention and the Ni(acac)$_2$ as the transition metal compound was contained, the polymerization activity is $5.3 \times 10^5$ (g/mol) or more and high.

As shown in Table 4, even in the case of comparing Example 4 and Comparative Example 2 (in both of which the ligand B-443 was used as the ligand), the same tendency as above was confirmed.

As shown in Table 5, even in the cases of comparing Example 5 and Comparative Example 4 (in both of which the ligand B-14 was used as the ligand), comparing Example 6 and Comparative Example 5 (in both of which the ligand B-30 was used as the ligand), comparing Example 7 and Comparative Example 6 (in both of which the ligand B-56DM was used as the ligand), comparing Example 8 and Comparative Example 7 (in both of which the ligand B-27DM was used as the ligand) and comparing Example 9 and Comparative Example 8 (in both of which the ligand B-125 was used as the ligand), the same tendency as above was confirmed.

In the case of comparing Example 3 and Comparative Example 3, while the metal complex using the Ni(acac)$_2$ prepared under the air atmosphere (Example 3) had the same level of polymerization activity as Example 1, the metal complex using the Ni(cod)$_2$ prepared under the air atmosphere (Comparative Example 3) was unstable and was not subjected to polymerization evaluation. Accordingly, while the metal complex using the Ni(cod)$_2$ needs to be prepared under a strict nitrogen atmosphere and requires sophisticated experimental techniques, the metal complex using the Ni(acac)$_2$ can be prepared under the air atmosphere and can be easily handled.

It was also confirmed that the weight average molecular weights, molecular weight distributions, crystallinities and melting points of Examples 1 to 3 and Comparative Example 1 are at the same levels, and the quality of the copolymers thus obtained was maintained. It was also confirmed that the weight average molecular weights, molecular weight distributions, crystallinities and melting points of Example 4 and Comparative Example 2 are at the same levels.

As shown in Table 5, it was confirmed that the weight average molecular weights, molecular weight distributions, crystallinities and melting points of Example 5 and Comparative Example 4, of Example 6 and Comparative Example 5, of Example 7 and Comparative Example 6, of Example 8 and Comparative Example 7, and of Example 9 and Comparative Example 8 are at the same levels.

As just described, the metal complex using the specific ligand of the present invention and the transition metal compound of the nickel(II) can exhibit high polymerization activity in the copolymerization of the α-olefin and the (meth)acrylic acid ester, can be prepared under the air atmosphere, and can be easily handled compared to the metal complex using the ligand and the transition metal compound of the nickel(0).

Due to the above reasons, it is clear that the metal complex of the present invention copolymerizes the α-olefin and the (meth)acrylic acid ester with higher polymerization activity than ever before, and has superior technical significance.

INDUSTRIAL APPLICABILITY

According to the present invention, the copolymer of the (meth)acrylic acid ester and the α-olefin can be industrially easily produced with high activity, and the molecular weight of the thus-obtained copolymer is high.

It is also presumed that not only the copolymer but also the α-olefin polymer obtains a high molecular weight.

In general, among polymer properties, the molecular weight is a dominant factor, and interaction between polymer chains is enhanced by increasing the molecular weight. Accordingly, the copolymer obtained by the present invention has superior mechanical and thermal properties, and it is applicable as a useful molded product.

Also, the catalyst in which nickel is used as a metal core in place of rare and expensive palladium, can be used in the present invention.

As just described, the present invention provides a novel method for producing the α-olefin/(meth)acrylic acid ester copolymer, and it is industrially usable very much.

The invention claimed is:

1. A method for producing an α-olefin/(meth)acrylic acid ester copolymer, comprising copolymerizing an α-olefin and a (meth)acrylic acid ester in presence of an olefin polymerization catalyst containing a metal complex, wherein the metal complex is obtained by reacting a compound of formula (A) or (B):

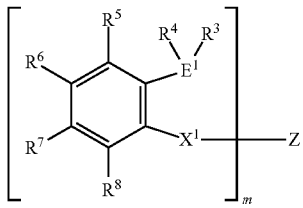

Formula (A)

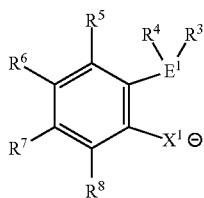

Formula (B)

with a transition metal compound of formula (C):

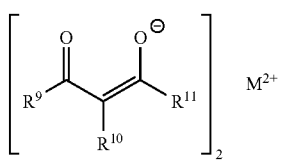

Formula (C)

where M is a transition metal countercation selected from nickel or palladium, and in the formulae (A) to (C), $R^3$ to $R^{11}$, $E^1$ and $X^1$ are as follows:
$X^1$ represents oxygen or sulfur;
$E^1$ represents phosphorus, arsenic or antimony;
$R^3$ and $R^4$ each independently represents a hydrocarbon group having 5 to 30 carbon atoms and optionally containing a heteroatom;
$R^5$ to $R^8$ each independently represents a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2;
$R^9$ to $R^{11}$ each independently represents a hydrogen atom or a hydrocarbon group having 1 to 20 carbon atoms and optionally containing a heteroatom, and
wherein, in the formula (A),
Z represents a hydrogen atom or a leaving group, and m represents a valence of Z.

2. A method for producing an α-olefin/(meth)acrylic acid ester copolymer, comprising copolymerizing an α-olefin and a (meth)acrylic acid ester in presence of an olefin polymerization catalyst containing a metal complex represented by formula (D):

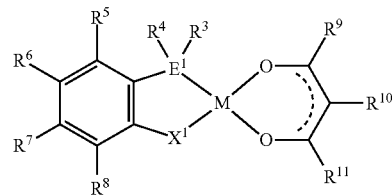

Formula (D)

wherein $R^3$ to $R^{11}$, $E^1$, $X^1$ and M are as follows:
M represents nickel or palladium;
$X^1$ represents oxygen or sulfur;
$E^1$ represents phosphorus, arsenic or antimony;
$R^3$ and $R^4$ each independently represents a hydrocarbon group having 5 to 30 carbon atoms and optionally containing a heteroatom;
$R^5$ to $R^8$ each independently represents a hydrogen atom, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2; and
$R^9$ to $R^{11}$ each independently represents a hydrogen atom or a hydrocarbon group having 1 to 20 carbon atoms and optionally containing a heteroatom.

3. The method for producing the α-olefin/(meth)acrylic acid ester copolymer according to claim 1, wherein $R^3$ and $R^4$ each independently represents a hydrocarbon group having 5 to 30 carbon atoms and at least one heteroatom-containing group.

4. The method for producing the α-olefin/(meth)acrylic acid ester copolymer according to claim 1, wherein $R^8$ represents a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2.

5. The method for producing the α-olefin/(meth)acrylic acid ester copolymer according to claim 1, wherein $R^9$ and $R^{11}$ are methyl groups, and $R^{10}$ is a hydrogen atom.

6. The method for producing the α-olefin/(meth)acrylic acid ester copolymer according to claim 1, wherein the polymerization catalyst further comprises an organoaluminum compound.

7. The method for producing the α-olefin/(meth)acrylic acid ester copolymer according to claim 2, wherein $R^3$ and $R^4$ each independently represents a hydrocarbon group having 5 to 30 carbon atoms and at least one heteroatom-containing group.

8. The method for producing the α-olefin/(meth)acrylic acid ester copolymer according to claim 2, wherein $R^8$ represents a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $OSO_2R^2$, $P(O)(OR^2)_{2-y}(R^1)_y$, $CN$, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group, where $R^1$ represents a hydrogen atom or a hydrocarbon group having 1 to 20 carbon atoms; $R^2$ represents a hydrocarbon group having 1 to 20 carbon atoms; M' represents an alkali metal, ammonium, quaternary ammonium or phosphonium; x represents an integer of from 0 to 3; and y represents an integer of from 0 to 2.

9. The method for producing the α-olefin/(meth)acrylic acid ester copolymer according to claim 2, wherein $R^9$ and $R^{11}$ are methyl groups, and $R^{10}$ is a hydrogen atom.

10. The method for producing the α-olefin/(meth)acrylic acid ester copolymer according to claim 2, wherein the polymerization catalyst further comprises an organoaluminum compound.

11. The method for producing the α-olefin/(meth)acrylic acid ester copolymer according to claim 6, wherein the organoaluminum compound is at least one selected from the group consisting of a compound of formula (G) and an organoaluminum oxy compound having an Al—O—Al bond, $$Al(R^p)_a X_{(3-a)} \quad \text{Formula (G):}$$

where $R_p$ represents a hydrocarbon group having 1 to 20 carbon atoms; X represents a hydrogen atom, a halogen, an alkoxy group or a siloxy group; and "a" is a number that is greater than 0 and less than or equal to 3.

12. The method for producing the α-olefin/(meth)acrylic acid ester copolymer according to claim 10, wherein the organoaluminum compound is at least one selected from the group consisting of a compound of formula (G) and an organoaluminum oxy compound having an Al—O—Al bond, $$Al(R^p)_a X_{(3-a)} \quad \text{Formula (G):}$$

where $R^p$ represents a hydrocarbon group having 1 to 20 carbon atoms; X represents a hydrogen atom, a halogen, an alkoxy group or a siloxy group; and "a" is a number that is greater than 0 and less than or equal to 3.

* * * * *